US012675380B2

(12) United States Patent
Venkata et al.

(10) Patent No.: US 12,675,380 B2
(45) Date of Patent: Jul. 7, 2026

(54) MACHINE LEARNING-BASED BAD CABLE DETECTION

(71) Applicant: Juniper Networks, Inc., Sunnyvale, CA (US)

(72) Inventors: Vamsidhar Reddy Devireddy Venkata, Anantapur (IN); Pooja Sambhaji Ayanile, Latur (IN); Sanjeev Kumar Mishra, Bangalore (IN); Sabyasachi Mukhopadhyay, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 55 days.

(21) Appl. No.: 18/612,830

(22) Filed: Mar. 21, 2024

(65) Prior Publication Data

US 2025/0217245 A1      Jul. 3, 2025

(30) Foreign Application Priority Data

Dec. 27, 2023     (IN) .............................. 202341088978

(51) Int. Cl.
G06F 11/00          (2006.01)
G06F 11/22          (2006.01)
(52) U.S. Cl.
CPC .................................. G06F 11/221 (2013.01)
(58) Field of Classification Search
CPC .............. G06F 11/221; G06F 11/0793; G06F 11/2257; G06F 11/2263; G06F 11/2007
See application file for complete search history.

(56) References Cited

U.S. PATENT DOCUMENTS

| 8,381,044 | B2 | 2/2013 | Narin et al. | |
| 9,106,518 | B1 | 8/2015 | Presotto et al. | |
| 9,712,290 | B2 * | 7/2017 | Callaghan | H04L 1/244 |
| 9,729,439 | B2 | 8/2017 | MeLampy et al. | |
| 9,729,682 | B2 | 8/2017 | Kumar et al. | |
| 9,762,485 | B2 | 9/2017 | Kaplan et al. | |
| 9,832,082 | B2 | 11/2017 | Dade et al. | |

(Continued)

FOREIGN PATENT DOCUMENTS

WO       2005094000 A1    10/2005

OTHER PUBLICATIONS

U.S. Appl. No. 17/547,881, filed Dec. 10, 2021, naming inventors Wang et al.

*Primary Examiner* — Joseph D Manoskey
(74) *Attorney, Agent, or Firm* — Shumaker & Sieffert P.A.

(57)          ABSTRACT

Example systems, devices, and techniques are described for inferring a potential bad cable issue associated with a cable. An example system includes processing circuitry configured to determine a class of a cable associated with one of a plurality of network interfaces. The processing circuitry is configured to select, based on the class of the cable, a first machine learning model of a plurality of machine learning models. The processing circuitry is configured to determine, based on the class of the cable and the one of the plurality of network interfaces, a first feature set of the performance data. The processing circuitry is configured to execute the first machine learning model to infer, based on the first feature set, a potential bad cable issue associated with the cable and output an indication of the potential bad cable issue associated with the cable.

19 Claims, 9 Drawing Sheets

(56)                    References Cited

U.S. PATENT DOCUMENTS

| | | | |
|---|---|---|---|
| 9,871,748 B2 | 1/2018 | Gosselin et al. | |
| 9,985,883 B2 | 5/2018 | MeLampy et al. | |
| 10,200,264 B2 | 2/2019 | Menon et al. | |
| 10,277,506 B2 | 4/2019 | Timmons et al. | |
| 10,432,522 B2 | 10/2019 | Kaplan et al. | |
| 10,678,721 B1 * | 6/2020 | BeSerra | G06F 13/102 |
| 10,756,983 B2 | 8/2020 | Ratkovic et al. | |
| 10,862,742 B2 | 12/2020 | Singh | |
| 10,917,203 B2 * | 2/2021 | Wray | H04L 43/0847 |
| 10,958,537 B2 | 3/2021 | Safavi | |
| 10,958,543 B2 | 3/2021 | Dade et al. | |
| 10,958,585 B2 | 3/2021 | Safavi | |
| 10,985,969 B2 | 4/2021 | Safavi | |
| 10,992,543 B1 | 4/2021 | Rachamadugu et al. | |
| 11,621,742 B2 | 4/2023 | German et al. | |
| 11,635,748 B2 | 4/2023 | Gade et al. | |
| 12,212,451 B2 | 1/2025 | Mortensen et al. | |
| 2007/0022331 A1 | 1/2007 | Jamieson et al. | |
| 2012/0005532 A1 | 1/2012 | Li et al. | |
| 2013/0339515 A1 | 12/2013 | Radhakrishnan | |
| 2015/0295802 A1 | 10/2015 | Balakrishnan et al. | |
| 2015/0333998 A1 | 11/2015 | Gopalakrishnan et al. | |
| 2016/0204979 A1 | 7/2016 | Benner et al. | |
| 2017/0230233 A1 | 8/2017 | Sane | |
| 2019/0052518 A1 | 2/2019 | Gal et al. | |
| 2019/0165988 A1 | 5/2019 | Wang et al. | |
| 2020/0134175 A1 | 4/2020 | Marwah et al. | |
| 2020/0267203 A1 | 8/2020 | Jindal et al. | |
| 2020/0280508 A1 * | 9/2020 | Davey | H04L 45/03 |
| 2020/0403890 A1 | 12/2020 | McCulley et al. | |
| 2021/0044477 A1 | 2/2021 | Singh | |
| 2021/0168084 A1 | 6/2021 | Safavi | |
| 2021/0176143 A1 | 6/2021 | Dade et al. | |
| 2021/0226855 A1 | 7/2021 | Safavi | |
| 2021/0258239 A1 | 8/2021 | Richards et al. | |
| 2021/0273845 A1 | 9/2021 | Safavi | |
| 2021/0306201 A1 | 9/2021 | Wang et al. | |
| 2021/0384941 A1 * | 12/2021 | German | H04B 3/46 |
| 2023/0062982 A1 * | 3/2023 | Patterson | H04B 10/07 |
| 2023/0139081 A1 * | 5/2023 | Viclizki | G01R 31/008 |
| | | | 706/52 |
| 2024/0045418 A1 * | 2/2024 | Ganju | G05B 23/0216 |

* cited by examiner

| Feature | Optical (CWDM) | Optical (LR4) | Optical(ZR) | Copper(25G) | Copper(100G) |
|---|---|---|---|---|---|
| Interface Rx Packets | Yes | Yes | Yes | Yes | Yes |
| Interface Tx Packets | Yes | Yes | Yes | Yes | Yes |
| Interface State | Yes | Yes | Yes | Yes | Yes |
| FEC Uncorrected errors | Yes | | Yes | | Yes |
| Input CRC errors | Yes | Yes | Yes | Yes | Yes |
| Input Errors | Yes | Yes | Yes | | |
| Framing Errors | Yes | Yes | Yes | | |
| Receive power of all optical lanes | Yes | Yes | Yes | | |
| Optical interface low warning Threshold | Yes | Yes | Yes | | |
| Optical FEC | | | Yes | | |

FIG. 6

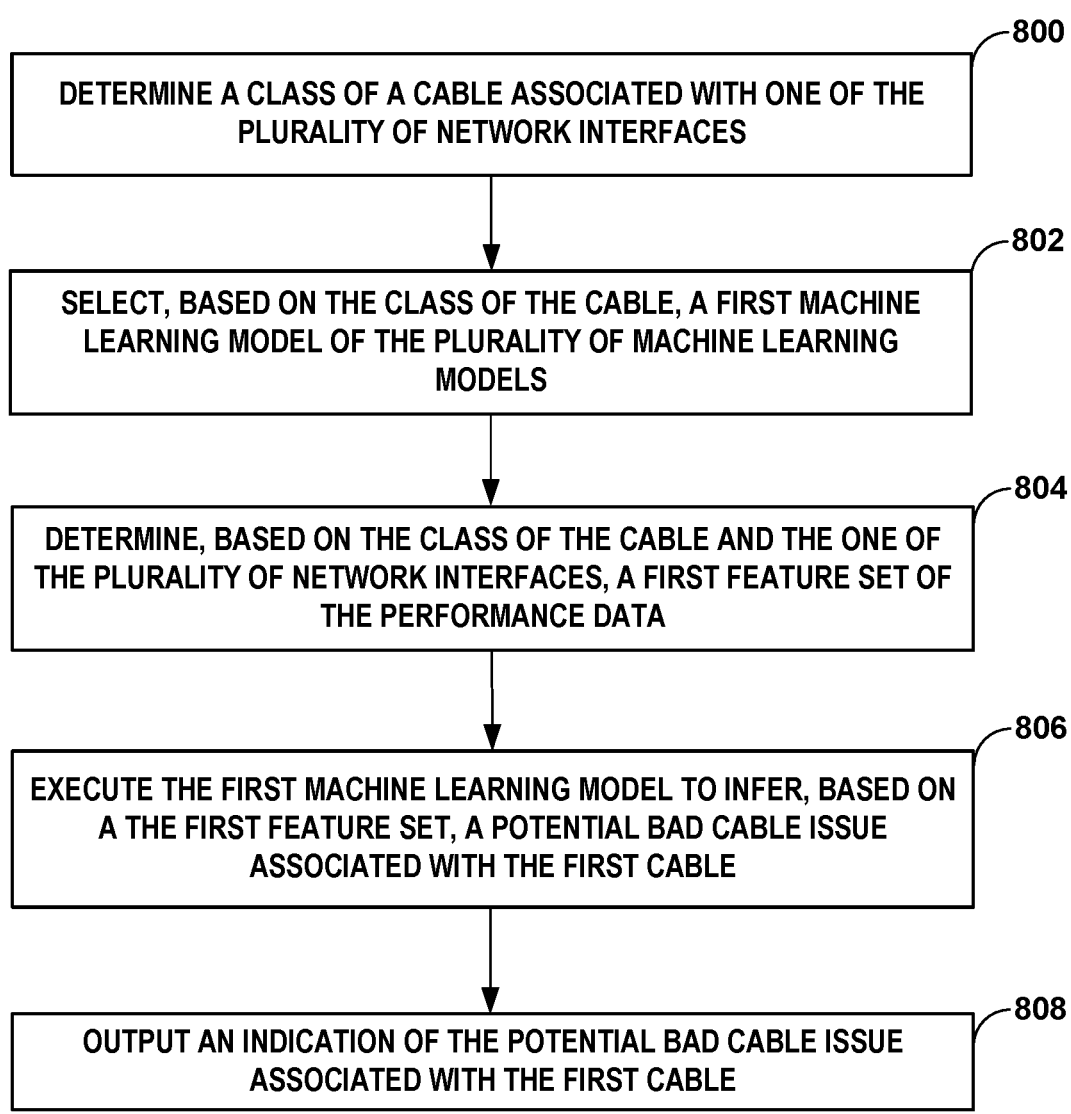

800

DETERMINE A CLASS OF A CABLE ASSOCIATED WITH ONE OF THE PLURALITY OF NETWORK INTERFACES

802

SELECT, BASED ON THE CLASS OF THE CABLE, A FIRST MACHINE LEARNING MODEL OF THE PLURALITY OF MACHINE LEARNING MODELS

804

DETERMINE, BASED ON THE CLASS OF THE CABLE AND THE ONE OF THE PLURALITY OF NETWORK INTERFACES, A FIRST FEATURE SET OF THE PERFORMANCE DATA

806

EXECUTE THE FIRST MACHINE LEARNING MODEL TO INFER, BASED ON A THE FIRST FEATURE SET, A POTENTIAL BAD CABLE ISSUE ASSOCIATED WITH THE FIRST CABLE

808

OUTPUT AN INDICATION OF THE POTENTIAL BAD CABLE ISSUE ASSOCIATED WITH THE FIRST CABLE

FIG. 8

MACHINE LEARNING-BASED BAD CABLE DETECTION

This application claims the benefit of India Provisional Patent Application No. 202341088978, filed 27 Dec. 2023, the entire contents of which is incorporated herein by reference.

TECHNICAL FIELD

The disclosure relates generally to computer networks and, more specifically, to monitoring and diagnostics of computer networks and network systems.

BACKGROUND

A computer network is a collection of interconnected computing devices that exchange data and share resources. In a packet-based network the computing devices communicate data by dividing the data into small blocks called packets. Certain device within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets allows the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may allow remotely located sources and receivers to share data. Network service providers provide services such as linking customer sites through a network core (VPN services) or subscribers to a service, security, tunneling, virtual private networks, filtering, load-balancing, VOIP/Multimedia processing and various types of application proxies (HTTP, XML, WAP, etc.) to incoming packets. Service providers also provide content-specific services designed to improve the quality of a user's experience, for example, video streaming and caching.

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. As the client devices move throughout the premises, they may automatically switch or "roam" from one wireless access point to another, in-range wireless access point, so as to provide the users with seamless network connectivity throughout the premises.

Devices in a computer network may be connected to one or more other devices in a computer network via one or more cables to enable communication between such devices. Such cables may include metallic wire cables, such as those including copper wires, or fiber optic cables.

SUMMARY

When a network cable is unplugged or completely breaks, it may be relatively easy for an administrator or information technology (IT) personnel to determine the cable is unplugged or has completely broken because all network traffic that normally would be transmitted through the cable drops. However, when a cable degrades or is not properly (e.g., completely) plugged in, the signal carried by the cable may be attenuated or weakened. This attenuation may cause a subset of network traffic that would otherwise traverse the cable to drop. Because the cable is partially functional, it may be relatively difficult for an administrator or IT personnel to determine whether the associated traffic drops are caused by a faulty cable, an improperly plugged in cable, or some other network or network device issue. It is therefore desirable to automatically detect a bad cable.

According to the techniques of this disclosure, a network management system may automatically determine that a cable is likely to be faulty or bad. Such a cable may include a metallic cable, such as a copper wire cable, or an optical cable. The system may use a plurality of trained machine learning models and, based on a class of a cable, select a specific machine learning model corresponding to the class of the cable. The system may use the selected machine learning model to detect a potentially faulty cable at inference time. The system may publish any failure results and analysis to a UI for display, for example, to an administrator or IT personnel. In some examples, the plurality of machine learning models may include a decision tree-based classification model, which provides an inference of whether a cable is faulty based on a plurality of input parameters to the selected machine learning model. Based on an inference that a cable is faulty, the network management system may output a recommendation that diagnostics, such as a TDR (time domain reflector) or Optical TDR test(s), be conducted, or may control an interface card or network device to automatically run diagnostics, such as the TDR or Optical TDR test(s), on an identified interface. The network management system may output a recommendation to replace a given cable. The network management system may recommend that traffic be rerouted or may automatically reroute traffic to avoid the faulty cable.

U.S. patent application Ser. No. 17/547,881 entitled "PHYSICAL LAYER ISSUE DETECTION BASED ON CLIENT-SIDE BEHAVIOR ASSESSMENTS" and filed on Dec. 10, 2021, which is incorporated by reference herein in its entirety, discusses the use of a machine learning model to detect an issue with an Ethernet cable. However, a network may include several hundred different cables from a variety of manufacturers. Such cables may include metallic cables and/or fiber optic cables, having different properties and features. For example, a machine learning model trained to detect an issue with one type of cable may detect an issue with another type of cable when no issue exists (false positive) and/or may not detect an issue when an issue does exist (false negative). As such, it may be desirable to provide techniques for detecting a potential bad cable issue with a plurality of different types of cables and that provide a reduced rate of false positive and false negatives for bad cable detection across each of the different types of cables.

This disclosure describes techniques that enable a network management system to monitor and assess performance data from network interfaces, such as network interfaces of network interface cards (NICs), associated with cables in order to detect potentially faulty or bad cables within a computer network. In order to provide wired connectivity in a computer network, network devices such as APs, routers, switches, and the other wired devices are connected, either directly or indirectly, to one or more other network devices via cables. Such cables may include metallic cables and/or fiber optic cables. While not limited to the wired network edge, bad cable issues may be common at the wired network edge as the APs and/or the wired IoT devices may be frequently moved (e.g., intentionally moved for upgrades, maintenance, or general cleaning or unintentionally bumped or jostled if positioned in high-traffic areas at the site) leading to loose, disconnected, broken, or otherwise non-functional Ethernet cables between the APs or IoT devices and the wired network devices.

As networks continue to grow and diversify in their wired connectivity to meet growing network demands, networks may become populated with a variety of different types of cables from different manufacturers. For example, in a given network some cables may be copper cables and some cables may be optical cables. Some of the copper cables may be configured for different purposes, such as a higher data rate, than others. Some of the optical cables, may be configured for different purposes than others. It may be desirable to provide a system that may automatically identify potential faulty or bad cable issues for any cable that may be deployed within a network, regardless of the type or intended use of the cable.

According to the techniques of this disclosure, a network management system may selected and execute a machine learning model associated with a particular class of cable and assess performance data such as data of a particular set of features associated with the particular class of cable. The network management system may, using the machine learning model, determine whether features of the performance data are indicative of a bad cable issue associated with the particular network interface.

In some examples, the network management system may implement an event processing platform for providing real-time insights and simplified troubleshooting for IT operations, and that automatically takes corrective action or provides recommendations to proactively address network issues. According to the disclosed techniques, the network management system may execute a bad cable detection engine configured to determine a respective set of features associated with performance data collected from each of the network interfaces. In some examples, the bad cable detection engine may be configured to determine a class of a cable associated with a particular network interface based on the respective set of features. The bad cable detection engine may be configured to, based on the class of the cable, determine an identification of a machine learning model from a plurality of machine learning models. For example, each of the plurality of machine learning models may be associated with a corresponding class of cables.

The bad cable detection engine may be configured to execute the machine learning model on performance data associated with the particular network interface to determine whether features of the performance data indicate a potential bad cable issue at a particular port of the network interface. In the case of a potential bad cable issue being detected, the network management system may output an indication of the potential bad cable issue. The indication may include a command which automatically takes an action, such as to reroute network traffic away from the potentially bad cable, collect metrics relating to interfaces or devices to which the potentially bad cable is/was connected, run diagnostics over the potentially bad cable or associated interfaces, and/or the like. The indication may include a notification, e.g., to a network administrator, or IT personnel, with a recommended action to test and/or replace the cable connected to the particular port of the NIC. In this way, the network management system executing the bad cable detection engine provides for a relatively quick determination of a network issue and, in some cases, automatically alters the network behavior to address or further investigate the network issue and/or brings the network issue to the attention of a network administrator, or IT personnel, for further action.

Conventionally, identifying a bad cable issue, for example, at the wired network edge, requires a cable test during which high load packets are sent from a wired network device across a cable to another wired network device for approximately one minute and a readout is examined to determine whether the packets were successfully transmitted. This deterministic approach, however, stops all other traffic on the cable for the full minute while the cable test is run. As such, it is not feasible to run cable tests every day across potentially tens-of-thousands of cables that may be connected to the wired network devices. In addition, the cable test requires control of both sides of the cable. However, in many instances where each network device is an edge device of a different network (e.g., a customer edge device like an AP and a provider edge device) control of both sides of the cable is problematic.

The techniques of this disclosure provide one or more technical advantages and practical applications. For example, the techniques enable automatic detection of potential bad cable issues of wired network devices based on performance data collected from network interfaces of wired network devices. The disclosed techniques may provide a probabilistic approach to bad cable detection that avoids network traffic disruptions and, thus, is scalable to enable frequent bad cable assessments for each of the potentially tens-of-thousands of cables connected to the wired network devices. The disclosed techniques may provide for bad cable detection of any type of cable and is not restricted to any given type of cable, such as optical or copper, or intended use of such cable. The disclose techniques may provide for a reduced rate of false positive and false negatives for bad cable detection across the various types of cables. In some examples, the disclosed techniques may provide for automatic diversion of network traffic away from a suspected bad cable and/or the automatic initiation of diagnostic testing of the suspected bad cable.

In addition, the disclosed techniques may enable client-side only, behavior-based bad cable detection, which is more applicable to the increasingly common situation in which the same entity does not own or have access to both the AP or other wired client-side devices and the wired network devices. The disclosed techniques may further avoid the need for administrators to manually check the network devices and the potentially tens-of-thousands of cables for bad cable issues. For example, upon receipt of a bad cable notification from the network management system, the administrator associated with the network device may initiate a cable test at the port of the network device identified in the notification or, in some cases, the administrator may skip the cable test and instead immediately initiate a cable replacement at the port of the network device identified in the notification.

In one example, this disclosure describes a network management system that includes one or more memories storing a plurality of machine learning models and performance data associated with each of a plurality of network interfaces; and one or more processors coupled to the one or more memories and configured to: determine a class of a cable associated with one of the plurality of network interfaces; select, based on the class of the cable, a first machine learning model of the plurality of machine learning models; determine, based on the class of the cable and the one of the plurality of network interfaces, a first feature set of the performance data; execute the first machine learning model to infer, based on the first feature set, a potential bad cable issue associated with the cable; and output an indication of the potential bad cable issue associated with the cable.

In another example, this disclosure describes a method including: determining a class of a cable associated with one of a plurality of network interfaces; selecting, based on the class of the cable, a first machine learning model of a plurality of machine learning models; determining, based on the class of the cable and the one of the plurality of network interfaces, a first feature set of the performance data; executing the first machine learning model to infer, based on the first feature set, a potential bad cable issue associated with the cable; and outputting an indication of the potential bad cable issue associated with the cable.

In another example, this disclosure describes a computer-readable storage medium comprising instructions that, when executed, cause one or more processors of the network management system to: determine a class of a cable associated with one of a plurality of network interfaces; select, based on the class of the cable, a first machine learning model of a plurality of machine learning models; determine, based on the class of the cable and the one of the plurality of network interfaces, a first feature set of the performance data; execute the first machine learning model to infer, based on the first feature set, a potential bad cable issue associated with the cable; and output an indication of the potential bad cable issue associated with the cable.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 6 is a table illustrating features for each of a plurality of cable classes in accordance with one or more aspects of this disclosure.

FIG. 8 is a flow chart illustrating example bad cable detection techniques in accordance with one or more aspects of this disclosure.

DETAILED DESCRIPTION

Figure 1A:
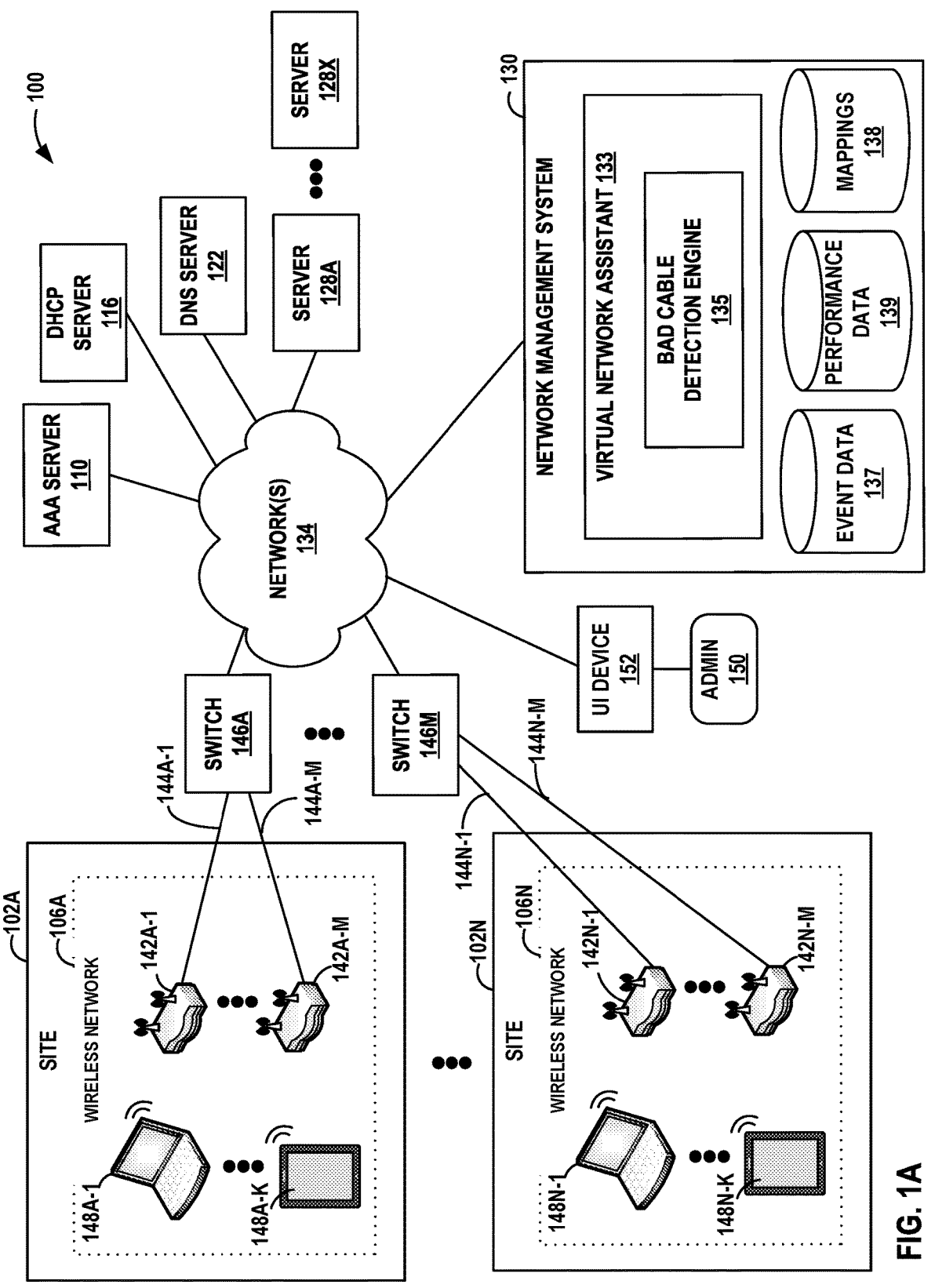
FIG. 1A is a block diagram of an example network system including a network management system configured to monitor and assess client-side performance data to detect potential bad cable issues at network devices in accordance with one or more aspects of this disclosure.

FIG. 1A is a block diagram of an example network system 100 including a network management system (NMS) 130 that executes a bad cable detection engine 135 configured to monitor and assess performance data to detect potential bad cable issues at network interfaces in accordance with one or more aspects of this disclosure. In some examples, a virtual network assistant (VNA) 133 implements bad cable detection engine 135. Example network system 100 includes a plurality of sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of wired client-side devices, such as access points (APs) 142 and IoT devices, within the wired network edge. For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to the wired network and is capable of providing wireless network access to client devices within the site.

Each site 102A-102N also includes a plurality of client devices, otherwise known as user equipment devices (UEs), referred to generally as UEs 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) of the wired network via cables, such as metallic (e.g., copper) cables or fiber optics cables. In the example of FIG. 1A, each of APs 142A-1 through 142A-M at site 102A are connected to a switch 146A via cables 144A-1 through 144A-M, respectively, and each of APs 142N-1 through 142N-M at site 102N are connected to a switch 146M via cables 144N-1 through 144N-M, respectively. Although illustrated in FIG. 1A as if all APs 142 of a given site 102 being connected to a single one of switches 146, in other examples, the APs and the other wired client-side devices of a given site may be connected to two or more switches within the wired network. Throughout this disclosure the APs 142 and other wired client-side devices at sites 102A-102N along with switches 146A through 146M are referred to as the wired network edge. In addition, throughout this disclosure, switches 146 may be considered "third-party" wired network devices as switches 146 may be owned and/or associated with different entities than APs 142 and the other wired client-side devices. While only cables 144N-1 through 144N-M are labeled in FIG. 1, the techniques for bad cable detection disclosed herein can be applied to detect bad cables throughout network system 100, including those cables connecting switches 146A-146M to one another and to other devices via networks(s) 134.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1A, the various devices and systems of network 100 are coupled together via one or more network(s) 134, e.g., the Internet and/or an enterprise intranet. Each one of the servers 110, 116, 122 and/or 128, APs 142, UEs 148, switches 146, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such alerts, alarms, graphical indicators on dashboards, log messages, text/short message service (SMS) messages, email messages, and the like, and/or recommendations regarding wireless network issues to an administrator ("admin") 150 interacting with and/or operating user interface (UI) device 152. Additionally, in some examples, NMS 130 operates in response to configuration input received from admin 150 interacting with and/or operating UI device 152.

Admin 150 and UI device 152 may comprise IT personnel and/or an administrator computing device associated with one or more of sites 102 and/or switches 146 at the wired network edge. UI device 152 may be implemented as any suitable device for presenting output and/or accepting user input. For instance, UI device 152 may include a display. UI device 152 may be a computing system, such as a mobile or non-mobile computing device operated by a user and/or by administrator 150. UI device 152 may, for example, represent a workstation, a laptop or notebook computer, a desktop computer, a tablet computer, or any other computing device that may be operated by a user and/or present a user interface in accordance with one or more aspects of the present disclosure. UI device 152 may be physically separate from and/or in a different location than NMS 130 such that UI device 152 may communicate with NMS 130 via network 134 or other means of communication.

In some examples, NMS 130 monitors event data 137, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include an event processing platform for providing real-time insights and simplified troubleshooting for IT operations, and that automatically takes corrective action or provides recommendations to proactively address wireless network issues. NMS 130 may process hundreds or thousands of concurrent streams of event data 137 from sensors and/or agents associated with APs 142 and/or nodes within network 134. For example, NMS 130 may include an underlying analytics and network error identification engine and alerting system in accordance with various examples described herein. The underlying analytics engine may apply historical data and models to the inbound event streams to compute assertions, such as identified anomalies or predicted occurrences of events constituting network error conditions. Further, NMS 130 may provide real-time alerting and reporting to notify admin 150 via UI device 152 of any predicted events, anomalies, trends, and may perform root cause analysis and automated or assisted error remediation. In some examples, NMS 130 may apply machine learning techniques to identify the root cause of error conditions detected or predicted from the streams of event data 137. If the root cause may be automatically resolved, NMS 130 may invoke one or more corrective actions to correct the root cause of the error condition, thus automatically improving the underlying SLE metrics and also automatically improving the user experience. In some examples, event data 137 may include indication(s) of potential bad cable issues associated with wired interfaces within network system 100.

In operation, NMS 130 observes, collects, determines, and/or receives event data 137, which may take the form of data extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein.

In accordance with one or more techniques of this disclosure, NMS 130 is configured to monitor and assess performance data 139 from network interfaces of devices such as APs 142 and the other wired devices, e.g., IoT devices, in order to detect potential bad cable issues. In some examples, performance data 139 may be a subset of event data 137 received from APs 142 and the other wired client-side devices at sites 102. In some examples, NMS 130 may obtain performance data 340 by querying various network devices to send performance data to NMS 130. In some examples, such queries may occur on a periodic basis. In some examples, the period between queries may be approximately 3 minutes. In some examples, the period between queries may be configurable by an administrator 150. For example, administrator 150 may set the period between queries to be every 1 minute, every 10 minutes, or any other time period.

Bad cable issues are relatively common at the wired network edge as APs 142 and/or the other wired client-side devices which may be frequently moved (e.g., intentionally moved for upgrades, maintenance, or general cleaning or unintentionally bumped or jostled if positioned in high-traffic areas at the site) leading to loose, disconnected, broken, or otherwise non-functional cables 144 between the APs 142 or the other wired client-side devices and switches 146. Conventionally, identifying a bad cable issue at the wired network edge requires a cable test during which high load packets are sent from a wired network device across a machine learning algorithm, and/or a type of cable to one or more features to be used as input to the machine learning algorithm.

For example, NMS 130 may obtain performance data (e.g., including command and/or telemetry data) of various network devices periodically, such as through fetching or receiving the performance data. In some examples, NMS 130 may obtain output of a "show chassis hardware" command or similar command. An example output of a "show chassis hardware" command follows:

root@epic-taco> show chassis hardware

Hardware inventory:

| Item | Version | Part number | Serial number | Description |
|---|---|---|---|---|
| Chassis | | | YW3622190017 | JNP7100-48L [ACX7100-48L] |
| PSM 0 | REV 05 | 740-085431 | 1ED7C120776 | PSU 1600W AC, Front to Back Airflow |
| PSM 1 | REV 05 | 740-085431 | 1ED7C120775 | PSU 1600W AC, Front to Back Airflow |
| Routing Engine 0 | REV 09 | 611-112446 | YY3622180098 | RE-JNP-7100 |
| CB 0 | REV 12 | 650-113149 | YW3622190017 | Control Board |
| FPC 0 | BUILTIN | BUILTIN | ACX7100-48L | |
| PIC 0 | BUILTIN | BUILTIN | MRATE- 48xSFP56 + 6xQSFP56-DD | |
| Xcvr 1 | REV 01 | 740-021308 | CG30KM23T | SFP+-10G-SR |
| Xcvr 2 | REV 01 | 740-021308 | CG30KM05D | SFP+-10G-SR |
| Xcvr 3 | REV 01 | 740-021308 | CG30KM383 | SFP+-10G-SR |
| Xcvr 10 | REV 01 | 740-030658 | AA1304A8R4M | SFP+-10G-USR |
| Xcvr 11 | REV 01 | 740-030658 | AA1304A8RGM | SFP+-10G-USR |
| Xcvr 12 | REV 01 | 740-031980 | AHK017R | SFP+-10G-SR |
| Xcvr 13 | REV 01 | 740-031980 | ANK1GAR | SFP+-10G-SR |
| Xcvr 14 | REV 01 | 740-021308 | AJQ0TKM | SFP+-10G-SR |
| Xcvr 15 | REV 01 | 740-021308 | AJQ0TDY | SFP+-10G-SR |
| Xcvr 48 | REV 01 | 740-061408 | 1AMQ5225096 | QSFP-100G-CWDM4 |
| Xcvr 50 | REV 01 | 740-061409 | 1AMQA5230YE | QSFP-100GBASE-LR4-T2 |
| Fan Tray 0 | | | | JNP7100 Fan Tray, Front to Back Airflow - AFO |
| Fan Tray 1 | | | | JNP7100 Fan Tray, Front to Back Airflow - AFO |
| Fan Tray 2 | | | | JNP7100 Fan Tray, Front to Back Airflow - AFO |
| Fan Tray 3 | | | | JNP7100 Fan Tray, Front to Back Airflow - AFO |
| Fan Tray 4 | | | | JNP7100 Fan Tray, Front to Back Airflow - AFO |
| Fan Tray 5 | | | | JNP7100 Fan Tray, Front to Back Airflow - AFO | cable to an AP or other wired client-side device for approximately one minute and a readout is examined to determine whether the packets were successfully transmitted. This deterministic approach, however, stops all other traffic on the cable for the full minute while the cable test is run. As such, it is not feasible to run cable tests every day across potentially tens-of-thousands of cables that may be connected to the wired network devices. In addition, the cable test requires control of both sides of the cable (e.g., ownership or at least access to both the wired network device and the AP or wired client-side device).

Because different cables of different types or classes may perform very differently than each other, whether or not such cables are bad, and because different classes of cables may have different features associated therewith, it may be desirable to assess different classes of cables differently. As such, according to the techniques of this disclosure, NMS 130 determines a class of cable associated with the particular network interface, for example by executing a command using a device user interface, such as a "show chassis command" or by looking up the class of cable in mappings 138. In some examples, the class of cable in mappings 138 may be automatically determined. In some examples, the class of cable in mappings 138 may be manually entered, such as by administrator 150 via UI device 152. For example, mappings 138 may include mappings of a particular wired interface to a type of cable, a type of cable to a This output may include, for any new interface being added, connected, or the like, a connection module part number, e.g., Xcvr 1 REV 01 740-021308 CG30KM23T SFP+-10G-SR.

NMS 130 may maintain a part number to model type mapping in mappings 138, for example via CSV/Json file or database entry, e.g.:

```
{
    "part_number": "740-021308",
    "model_to_validate": "LR4"
},
```

The class of cable may be associated with a particular set of features. Such features may include at least one of a count of a number of transmit packets, a count of a number of receive packets, a number of bytes of transmit packets, a number of bytes of receive packets, an interface state, forward error correction (FEC) uncorrected errors, input cyclic redundancy check (CRC) errors, input errors, framing errors, receive power of all optical lanes, optical interface low warning threshold, or optical FEC. Each class of cable may be associated with its own particular set of features of performance data 139. Furthermore, even if a feature applies to a particular class of cable, the feature may be less useful as an indication of a bad cable for that class of cable.

Mappings 138 may accordingly include features selected for association with the class of cable. NMS 130 may store the associations or mappings of wired interfaces to classes of cables, classes of cable to machine learning models, and/or classes of cable to feature sets to be used as inputs to the machine learning models in mappings 138, e.g., in a database, spreadsheet, or other data organization modality. An example mapping of features for each of a plurality of cable classes is described hereinafter with respect to FIG. 6.

Bad cable detection engine 135 may select a machine learning model from among a plurality of machine learning models, each associated with a respective class of cable, based on the class of the cable. NMS 130 may execute the selected machine learning model to assess the performance data 139 to infer a potential bad cable issue using data from the feature set associated with the class of the cable as input.

Bad cable detection engine 135 is configured to assess the different types of performance data 139 collected from each of the APs 142 and other wired devices within network system 100, such as wired devices at sites 102 or switches 146A-146M. For example, bad cable detection engine 135 may be configured to determine one or more features of performance data 139 collected for a particular one of APs 142, e.g., AP 142A-1, over a window of time (e.g., during a last 7 days, or a last 4 days, or a last X days, where X is an integer). Bad cable detection engine 135 may be configured to detect, based on the one or more features over the window of time, a potential bad cable issue at a network interface of a particular network device, e.g., switch 146A, to which a network device, such as client-side device 142A-1, is connected via cable 144A-1.

Bad cable detection engine 135 may be configured to process certain of the collected performance data 139 from a network device, such as AP 142A-1, with a selected machine learning model as input, and determine, as output from the selected machine learning model, whether features of the performance data 139 indicate a potential bad cable issue, such as a potential bad cable issue at the particular port of switch 146A to which AP 142A-1 is connected via cable 144A-1. For example, any of the plurality of machine learning models, including the selected machine learning model, may include a supervised machine learning model that is trained using training data including pre-collected, labeled performance data received from network devices. The training data may include sets of performance data each labeled as being indicative of a bad cable issue or indicative of no bad cable issue. In this example, the machine learning model is trained using labeled sets of performance data because the features of the pre-collected performance data may also be indicative of other network error conditions. In some examples, any of the plurality of machine learning models, including the selected machine learning model, may include an unsupervised machine learning model.

In the case of a potential bad cable issue being detected, NMS 130 may output an indication of a potential bad cable issue. The indication may include identification information of the particular port of the particular network interface of the particular network device (e.g., switch 146A), e.g., to administrator 150 via UI device 152 of an entity that owns or has access to the particular network device. In some examples, NMS 130 may determine a recommended action based on the detected potential bad cable issue. The indication of the potential bad cable issue may include the recommended action, such as to test and/or replace the cable (e.g., cable 144A-1 connected to the particular port of switch 146A). In this way, NMS 130 executing bad cable detection engine 135 provides wired assurance for the wired network spanning from the APs 142 or other wired client-side devices to the wired network devices 146 at the wired network edge and potentially throughout network system 100. In some examples, the indication of the potential bad cable issue may include a command to perform an action, such as a command directed to a network device to automatically reroute traffic away from the potential bad cable or to automatically perform testing on the potential bad cable. In some examples, the content(s) of the indication of the potential bad cable issue may be user configurable, for example, by administrator 150 and/or IT personnel.

Although the techniques of the present disclosure are described in this example as performed by NMS 130, it shall be understood that techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
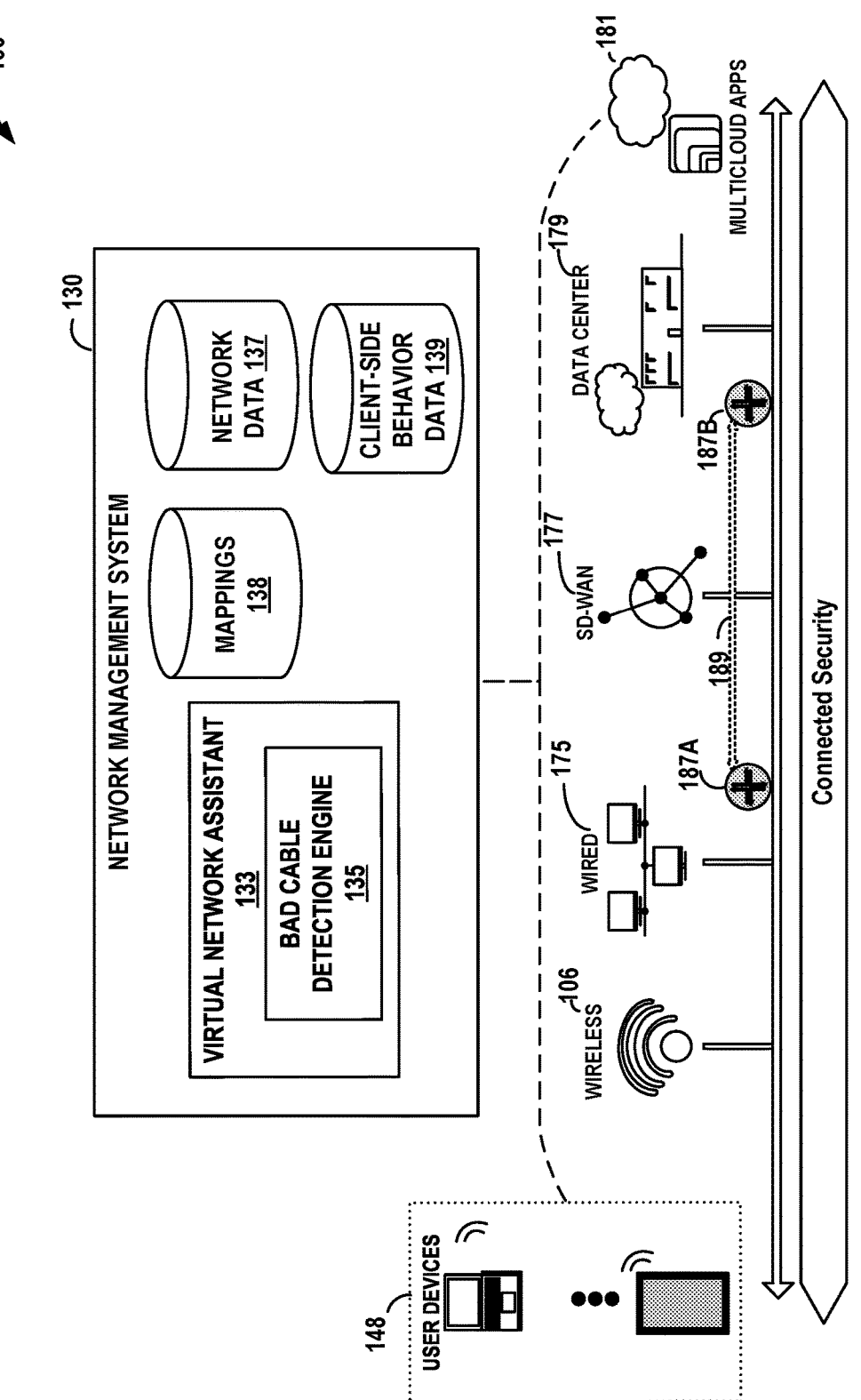
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to a machine learning-based computing platform providing comprehensive automation, insight, and assurance (WiFi Assurance, Wired Assurance and WAN assurance) spanning from wireless network 106 and wired LAN 175 at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100. In some examples, NMS 130 includes a natural language processing engine to provide AI-driven support and troubleshooting, anomaly detection, AI-driven location services, and AI-drive RF optimization with reinforcement learning.

As illustrated in the example of FIG. 1B, NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

In accordance with the techniques described in this disclosure, NMS 130 executes bad cable detection engine 135 configured to assess performance data 139 collected from each of the network devices, such as APs 142 and other wired devices. For example, bad cable detection engine 135 is configured to determine a class of cable associated with one of a plurality of network interfaces. Bad cable detection engine 135 is configured to select, based on the class of cable, a machine learning model of a plurality of machine learning models. Bad cable detection engine 135 is configured to determine, based on the class of the cable and the network interface associated with the cable, a first feature set of performance data 139. Bad cable detection engine 135 is configured to execute the selected machine learning model to infer, based on the first feature set, a potential bad cable issue associated with the cable. NMS 130 is configured to output an indication of a potential bad cable issue associated with the cable. In some examples, the indication of the potential bad cable issue includes identification information of the particular port of the particular network interface and the particular network device within wired LAN 175, e.g., to an administrator associated with the particular network device. In this way, NMS 130 provides wired assurance for the wired network, for example, of network system 100.

Figure 2:
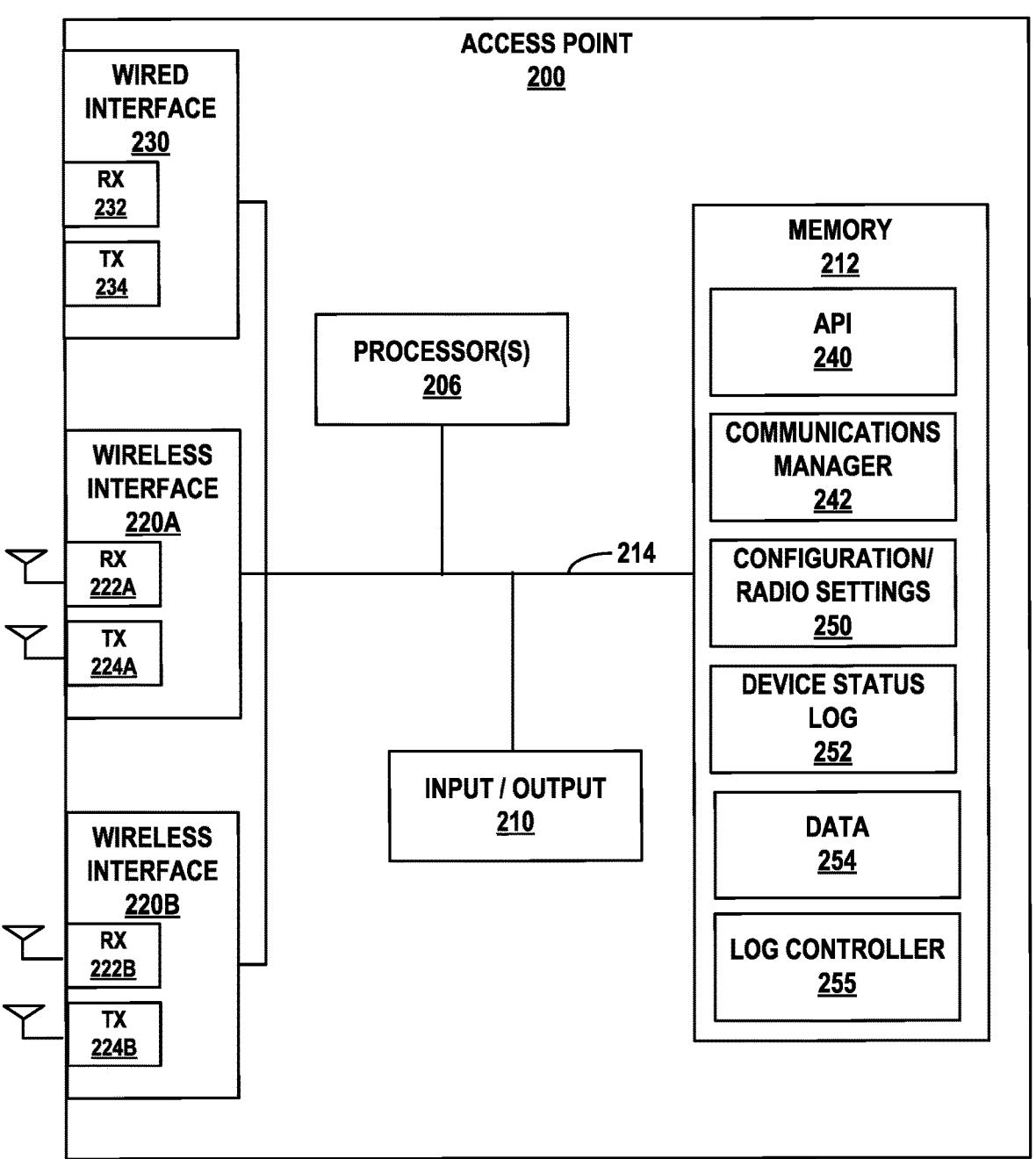
FIG. 2 is a block diagram of an example access point device in accordance with one or more aspects of this disclosure.

FIG. 2 is a block diagram of an example access point (AP) device 200 configured in accordance with one or more aspects of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. In some examples, wired interface 230 is implemented on a network interface card (NIC) that may be removable from access point 200. Wired interface 230 couples, either directly or indirectly, access point 200 to a wired network device, such as one of switches 146 of FIG. 1A, within the wired network via a cable, such as one of Ethernet cables 144 of FIG. 1A.

First and second wireless interfaces 220A and 220B represent wireless network interfaces and include receivers 222A and 222B, respectively, each including a receive antenna via which access point 200 may receive wireless signals from wireless communications devices, such as UEs

148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 may include one or more programmable hardware-based processors configured to execute software instructions, such as those used to define a software or computer program, stored to a computer-readable storage media (such as memory 212), such as non-transitory computer-readable media including one or more storage devices (e.g., disk drive, and/or optical drive), memory (such as Flash memory and/or RAM), and/or any other type of volatile and/or non-volatile memory, that stores instructions to cause the one or more processors 206 to perform the techniques described herein.

Memory 212 may include one or more devices configured to store programming modules and/or data associated with operation of access point 200. For example, memory 212 may include computer-readable storage media, such as non-transitory computer-readable media including one or more storage devices (e.g., disk drive, and/or optical drive), memory (such as Flash memory and/or RAM), and/or any other type of volatile and/or non-volatile memory, that stores instructions to cause the one or more processor(s) 206 to perform the techniques described herein.

In this example, memory 212 stores executable software including an application programming interface (API) 240, a communications manager 242, configuration settings 250, a device status log 252 and data storage 254. Device status log 252 includes a list of events specific to access point 200. The events may include a log of both normal events and error events such as, for example, memory status, reboot or restart events, crash events, cloud disconnect with self-recovery events, low link speed or link speed flapping events, port status, interface packet errors, upgrade failure events, firmware upgrade events, configuration changes, etc., as well as a time and date stamp for each event. Log controller 255 determines a logging level for the device based on instructions from NMS 130. Data 254 may store any data used and/or generated by access point 200, including data collected from UEs 148, such as data used to calculate one or more SLE metrics, that is transmitted by access point 200 for cloud-based management of wireless networks 106A by NMS 130.

Input/output (I/O) 210 may represent physical hardware components that enable interaction with a user, such as buttons, a display, and the like. Although not shown, memory 212 typically stores executable software for controlling a user interface with respect to input received via I/O 210.

Communications manager 242 may include program code that, when executed by processor(s) 206, allow access point 200 to communicate with UEs 148 and/or network(s) 134 via any of interface(s) 230 and/or 220A-220C. Configuration settings 250 may include any device settings for access point 200 such as radio settings for each of wireless interface(s) 220A-220C. These settings may be configured manually or may be remotely monitored and managed by NMS 130 to optimize wireless network performance on a periodic (e.g., hourly or daily) basis.

As described herein, AP device 200 may measure and report network event data, including performance data, from device log 252 to NMS 130. The performance data may include various parameters indicative of the performance and/or status of the wireless network, including of wired interface 230. The parameters may be measured and/or determined by one or more of the UE devices and/or by one or more of the APs 200 in a wireless network. NMS 130 may determine one or more SLE metrics and stores the SLE metrics as event data 137 (FIG. 1A) based on the SLE-related data received from the APs in a wireless network.

The performance data may include data observed at AP device 200, for example, performance data of wired interface 230. For example, the performance data may include a count of a number of transmit packets, a count of a number of receive packets, a number of bytes of transmit packets, a number of bytes of receive packets, an interface state, forward error correction (FEC) uncorrected errors, input cyclic redundancy check (CRC) errors, input errors, framing errors, receive power of all optical lanes, optical interface low warning threshold, optical FEC, and/or the like. NMS 130 may identify the relevant performance data from the network event data received from the APs in a wireless network, and store the performance data as performance data 139 (FIG. 1A).

Figure 3:
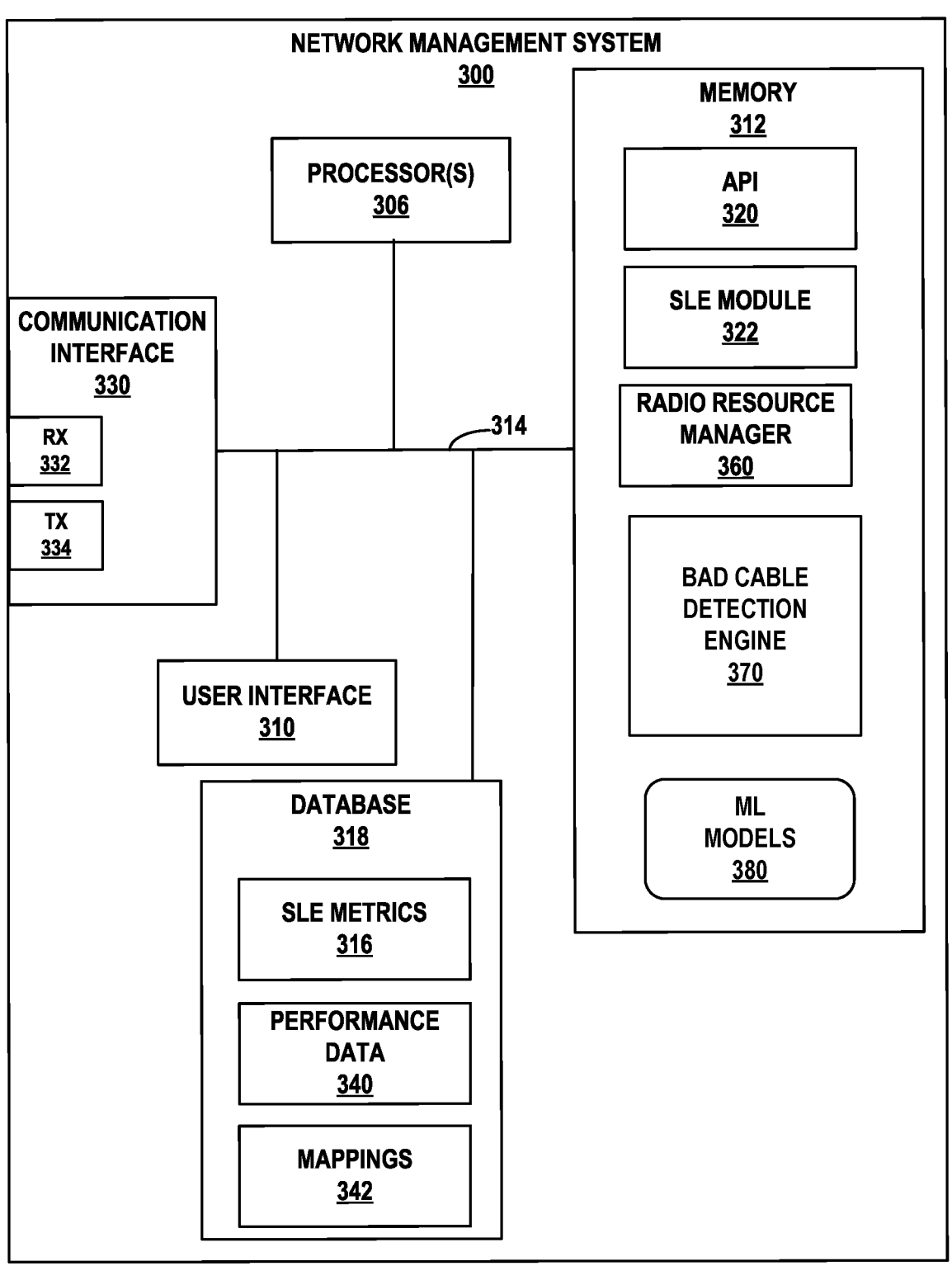
FIG. 3 is a block diagram of an example network management system having a bad cable detection engine in accordance with one or more aspects of this disclosure.

FIG. 3 is a block diagram of an example NMS 300 having a bad cable detection engine 370 configured to monitor and assess performance data 340 to detect potential bad cable issues at network devices in accordance with one or more aspects of this disclosure. NMS 300 may be an example of NMS 130 of FIG. 1A. For example, NMS 300 may be responsible for monitoring and management of one or more wireless networks 106A-106N at sites 102A-102N, respectively.

NMS 300 may include a communications interface 330, one or more processor(s) 306, a user interface 310, a memory 312, and a database 318. The various elements are coupled together via a bus 314 over which the various elements may exchange data and information. In some examples, NMS 300 receives event data from APs 142, or other network devices, which may be used to calculate one or more SLE metrics and/or identify relevant performance, and analyzes this data for cloud-based management of wireless networks 106A-106N. The event data is stored as, for example, SLE metrics 316 in database 318. In some examples, a subset of the event data may be identified as relevant performance data and may be stored as performance data 340 in database 318.

In some examples, NMS 300 may obtain performance data 340 by querying various network devices to send performance data to NMS 300. In some examples, such queries may occur on a periodic basis. In some examples, NMS 300 may store performance data associated with wired interface 230 (FIG. 2) and/or other wired network interfaces of network devices as performance data 340. NMS 300 may store mappings 342, which may be an example of mappings 138 of FIG. 1A. In some examples, NMS 300 may be implemented by a server shown in FIG. 1A or by any other server, or NMS 300 may be a standalone appliance.

Processor(s) 306 may execute software instructions, such as those used to define a software or computer program, stored to computer-readable storage media (such as memory 312), such as non-transitory computer-readable media including one or more storage devices (e.g., disk drive, and/or optical drive), memory (such as Flash memory and/or RAM), and/or any other type of volatile and/or non-volatile memory, that stores instructions to cause the one or more processors 306 to perform the techniques described herein.

Communications interface 330 may include, for example, a network interface, such as an Ethernet interface. Communications interface 330 may couple NMS 300 to a network and/or the Internet, such as any of network(s) 134 as shown in FIG. 1A, and/or any local area networks. Communications interface 330 may include a receiver 332 and a transmitter 334 by which NMS 300 receives/transmits data and information to/from any of APs 142, servers 110, 116, 122, 128 and/or any other devices or systems forming part of network 100 such as shown in FIG. 1A.

The data and information received by NMS 300 may include, for example, SLE-related or event log data received from APs 142 used by NMS 300 to remotely monitor the performance of wireless networks 106A-106N. In accordance with the disclosed techniques, the data and information received by NMS 300 may also include performance data of wired network interfaces received from APs 142, other wired network devices at sites 102A-102N, and/or other wired network devices within network system 100. NMS 300 may further transmit data via communications interface 330 to any network devices, such as APs 142 at any of network sites 102A-102N, UI device 152 of administrator 150, and/or the like, to remotely manage wireless networks 106A-106N.

Memory 312 may include one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile and/or non-volatile memory, that stores instructions to cause the one or more processor(s) 306 to perform the techniques described herein.

In this example, memory 312 includes an API 320, an SLE module 322, a bad cable detection engine 370, and a radio resource management (RRM) engine 360. In accordance with the disclosed techniques, bad cable detection engine 370 determines a class of a cable, selects a particular machine learning model of machine learning models (ML models) 380 based on the class of cable, and executes the selected machine learning model of ML models 380 on performance data 340 associated with a network interface to determine whether features of performance data 340 associated with the cable indicate a potential bad cable issue at a particular port of the network interface. NMS 300 may also include any other programmed modules, software engines and/or interfaces configured for remote monitoring and management of wireless networks 106A-106N, including remote monitoring and management of any of APs 142/200 or other network devices.

SLE module 322 may enable set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N may collect SLE-related data from UEs 148A-1 through 148A-N currently connected to wireless network 106A. This data may be transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, may be transmitted to NMS 300 and be stored as, for example, SLE metrics 316 in database 318.

RRM engine 360 may monitor one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

Bad cable detection engine 370 may analyze data received from APs 142/200 as well as its own data to identify when undesired to abnormal states are encountered in one of wireless networks 106A-106N. For example, bad cable detection engine 370 may determine a potential bad cable is a root cause of any undesired or abnormal states, e.g., any poor SLE metric(s) at one or more of wireless network 106A-106N. In addition, bad cable detection engine 370 may automatically invoke one or more corrective actions intended to address the identified root cause(s) of one or more poor SLE metrics. Examples of corrective actions that may be automatically invoked by bad cable detection engine 370 may include, but are not limited to, rerouting traffic away from the bad cable, invoking diagnostic testing, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, bad cable detection engine 370 may proactively provide a notification including recommended corrective actions to be taken by IT personnel to address the network error.

In accordance with one or more techniques of this disclosure, bad cable detection engine 370 analyzes performance data 340 received from APs 142/200 and other network devices, e.g., IoT devices, in order to detect potential bad cable issues. For example, bad cable detection engine 370 assesses performance data 340 collected from network devices, such as each of the APs 142 and other network devices. Performance data 340 may include performance data associated with network interfaces, such as wired interface 230 (FIG. 2).

More specifically, bad cable detection engine 370 may be configured to determine a class of a cable associated with one of a plurality of network interfaces. Bad cable detection engine 370 may be configured to select, based on the class of the cable, a first machine learning model of the ML models 380. For example, each of ML models 380 may be associated with and/or specifically trained for use with a corresponding class of cable. Bad cable detection engine 370 may be configured to determine, based on the class of the cable, a first feature set of performance data 340. For example, the first feature set may include performance data of one or more specific features (e.g., including the values of the one or more specific features), such as features described hereinafter with respect to FIG. 6. Bad cable detection engine 370 may be configured to execute the first machine learning model to infer, based on the first feature set, a potential bad cable issue associated with the cable. NMS 300 may be configured to output an indication of the potential bad cable issue associated with the cable.

The first feature set of performance data 340 may include any one or more of a count of a number of transmit packets, a count of a number of receive packets, a number of bytes of transmit packets, a number of bytes of receive packets, an interface state, forward error correction (FEC) uncorrected errors, input cyclic redundancy check (CRC) errors, input errors, framing errors, receive power of all optical lanes, optical interface low warning threshold, and/or optical FEC.

Cables may belong to a class of cable but differ in some respects because the cables are different models or be manufactured by different manufacturers. Such cables within a class of cable can have differences in performance data due to their inherent structural differences. To address different properties of cables of different models or different manufacturers but that still belong to the same class of cable, in some examples, NMS 300 may normalize values of each feature of the first feature set prior to, or as part of, executing the first machine learning model. For example, NMS 300 may, for each cable within network system 100 of a class corresponding to the class of the cable, determine respective first feature sets. For example, for a given class of cable, a feature set may include data of one or more features, such as those discussed with respect to FIG. 6 below. NMS 300 may take values of a specific feature of a feature set across each of the cables of a given class of cable and normalize those values. NMS 300 may normalize values for each specific feature for the given class of cable. By normalizing values used to infer a potential bad cable issue, NMS 300 may improve the accuracy of the inference while limiting the number of machine learning models needed. For example, by normalizing values of features, NMS 300 may not need to use separate machine learning models for each specific model of cable but may use a single machine learning model per each class of cable.

ML models 380 may comprise a plurality of machine learning models, each trained to specifically be used with a corresponding class of cables. For example, each of ML models 380 may be trained using respective training data associated with a respective class of cables. For example, a first machine learning model of ML models 380 may be trained using training data associated with Optical (ZR) class cables, a second machine learning model of ML models 380 may be trained using training data associated with Copper (100G) class cables, and so on.

In some examples, one or more of ML models 380 may be trained using training data comprising pre-collected, labeled performance data received from network devices. Each of ML models 380 may be associated with a respective class of cable and may be trained using training data of that respective class of cable. In the example of a metallic wire class of cable, training data may include actual performance data, including performance data associated with actual bad cables and performance data associated with cables that are not bad. In the example of an optical class of cable, it may be more difficult to collect training data that includes actual performance data. While training data for an optical class of cable may include actual performance data, in some examples, training data for an optical class of cable may include data generated using a variable optical attenuator.

ML models 380 may comprise at least one decision tree model, random forest model, Catboostclassifier mode, logistical regression model, XGBClassifier model, support vector machine (SVM) model, or the like. The training data may include sets of performance data each labeled as being indicative of a bad cable issue or no bad cable issue. In this example, each model of ML models 380 may comprise a supervised machine learning model that is trained using labeled sets of performance data because the features of the pre-collected performance data may be indicative of other network error conditions besides bad cable issues. In other examples, ML models 380 may comprise one or more machine learning models whose training is unsupervised. Although not shown in FIG. 3, in some examples, database 318 may store the training data and bad cable detection engine 370 or a dedicated training system or module may be configured to train ML models 380 based on the training data to determine appropriate weights across the one or more features of the training data. That is, ML models 380 may be trained off-system but deployed using NMS 300. In some examples, Kubeflow may be used as a training pipeline. In some examples, a variable optical attenuator (not shown) may be used to generate training data for optical classes of cables.

While bad cable detection engine 370 is primarily discussed as being implemented within NMS 300 in the cloud, bad cable detection engine 370 may be otherwise implemented, such as a control point application in the cloud, in a customer device, in a private cloud, or the like.

In the case of a potential bad cable issue being inferred/detected, NMS 300 may output an indication of the potential bad cable issue. The indication may include a command which causes a network device to automatically take an action, such as reroute network traffic away from the potentially bad cable, run diagnostic testing, such as diagnostic testing over the potentially bad cable, and/or the like. The indication may include a recommendation, e.g., to a network administrator (e.g., admin 150 via UI device 152 of FIG. 1A), including a recommended action to test and/or replace the cable connected to the particular port of the network interface associated with the potentially bad cable. NMS 300 may output the indication of the potential bad cable via one or more of user interface 310, API 320, webhooks, or email via communication interface 330 for display on the UI device of the administrator. In this way, NMS 300 may provide for a relatively quick determination of a network issue and automatically alters the network behavior to address or further investigate the network issue and/or bring the network issue to the attention of a network administrator for further action.

Figure 4:
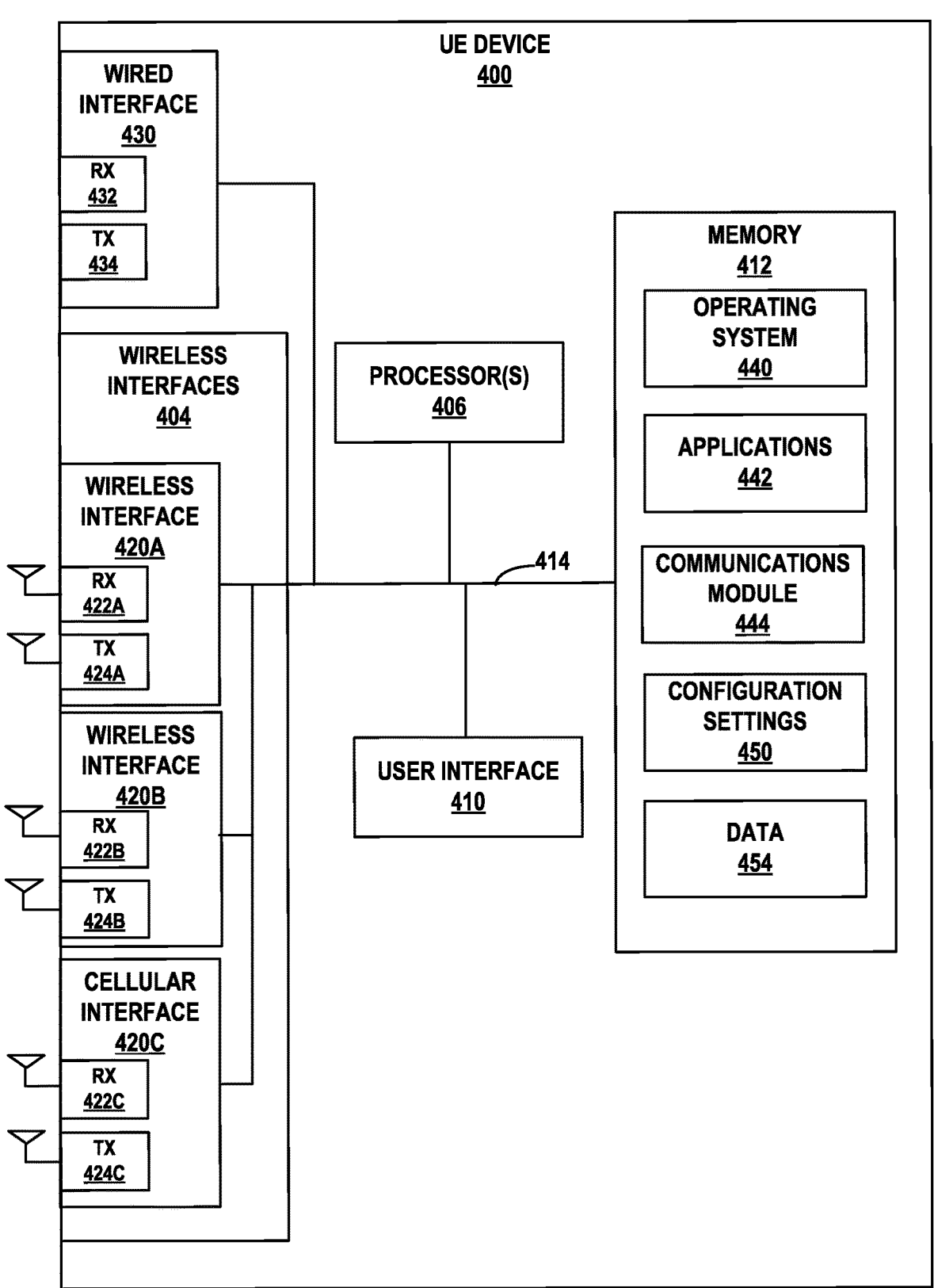
FIG. 4 is a block diagram of an example user equipment device in accordance with one or more aspects of this disclosure.

FIG. 4 is a block diagram of an example user equipment device in accordance with one or more aspects of this disclosure. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In accordance with techniques described in this disclosure, UE 400 may also include a wired client-side device, e.g., an IoT device such as a printer, a security sensor or device, an environmental sensor, or any other device connected to the wired network and configured to communicate over one or more wireless networks.

UE device 400 may include a wired interface 430, wireless interfaces 420A-420C, one or more processor(s) 406, memory 412, and a user interface 410. The various elements are shown coupled together via a bus 414 over which the various elements may exchange data and information. Wired interface 430 represents a physical network interface and includes a receiver 432 and a transmitter 434. In some examples, wired interface 430 is implemented on a NIC that may be removable from UE 400. Wired interface 430 may be used, if desired, to couple, either directly or indirectly, UE 400 to a wired network device, such as one of switches 146 of FIG. 1A, within the wired network via a cable, such as one of cables 144 of FIG. 1A.

First, second and third wireless interfaces 420A, 420B, and 420C may include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C may further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 may execute software instructions, such as those used to define a software or computer program, stored to computer-readable storage media (such as memory 412), such as non-transitory computer-readable media including one or more storage devices (e.g., disk drive, and/or optical drive), memory (such as Flash memory and/or RAM), and/or any other type of volatile and/or non-volatile memory, that stores instructions to cause the one or more processors 406 to perform the techniques described herein.

Memory 412 may include one or more devices configured to store programming modules and/or data associated with operation of UE 400. For example, memory 412 may include computer-readable storage media, such as non-transitory computer-readable media including one or more storage devices (e.g., disk drive, or optical drive), memory (such as Flash memory or RAM), and/or any other type of volatile and/or non-volatile memory, that stores instructions to cause the one or more processor(s) 406 to perform the techniques described herein.

In this example, memory 412 includes an operating system 440, applications 442, a communications module 444, configuration settings 450, and data storage 454. Data storage 454 may include, for example, a status/error log including a list of events specific to UE 400. The events may include a log of both normal events and error events according to a logging level based on instructions from NMS 130. Data storage 454 may store any data used and/or generated by UE 400, such as data used to calculate one or more SLE metrics or identify relevant performance data, that is collected by UE 400 and either transmitted directly to NMS 130 or transmitted to any of APs 142 in a wireless network 106 for further transmission to NMS 130.

As described herein, UE 400 may measure and report network event data, including performance data, from data storage 454 to NMS 130. The performance data may include various parameters indicative of the performance and/or status of the wireless network, including of wired interface 430. The performance data may include performance data of wired interface 430. For example, the performance data may include a count of a number of transmit packets, a count of a number of receive packets, a number of bytes of transmit packets, a number of bytes of receive packets, an interface state, forward error correction (FEC) uncorrected errors, input cyclic redundancy check (CRC) errors, input errors, framing errors, receive power of all optical lanes, optical interface low warning threshold, optical FEC, and/or the like. NMS 130 may identify the relevant performance data from the network event data received from UE device 400, and store the performance data as performance data 139 (FIG. 1A).

Communications module 444 may include program code that, when executed by processor(s) 406, enables UE 400 to communicate using any of wired interface(s) 430, wireless interfaces 420A-420B and/or cellular interface 450C. Configuration settings 450 may include any device settings for UE 400 settings for each of wireless interface(s) 420A-420B and/or cellular interface 420C.

Figure 5:
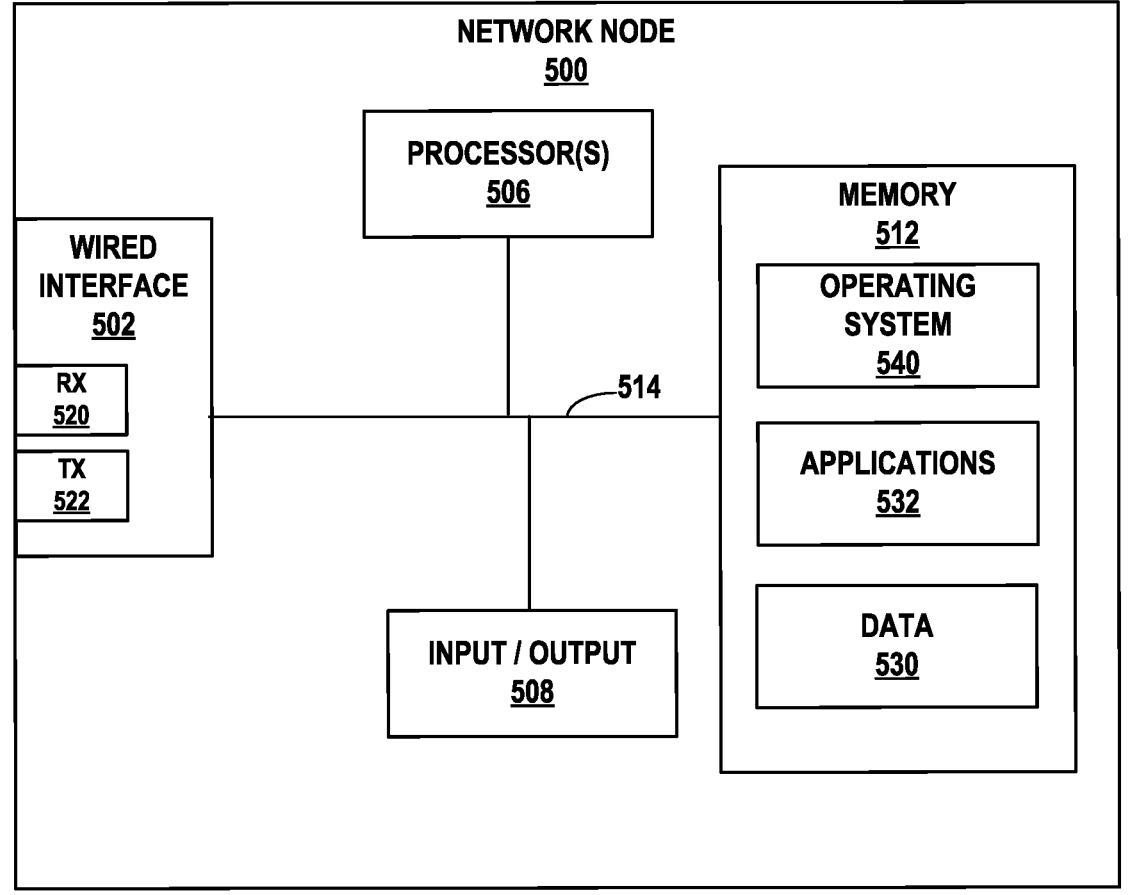
FIG. 5 is a block diagram of an example network node, such as a router or switch in accordance with one or more aspects of this disclosure.

FIG. 5 is a block diagram of an example network node, such as a router or switch in accordance with one or more aspects of this disclosure. In one or more examples, network node 500 implements a device or a server attached to the network(s) 134 of FIG. 1, e.g., router, switch, AAA server, DHCP server, DNS server, VNA, Web server, etc., or a network device such as, e.g., routers, switches, or the like. In some embodiments, network node 500 of FIG. 5 is server 110, 116, 122, 128, of FIG. 1A, switch 146 of FIG. 1A, or other routers or switches of network 134 of FIG. 1A.

In this example, network node 500 includes a wired interface 502 (which may be a metallic interface such as Ethernet interface, and optical interface, and/or the like), a processor 506, input/output 508, e.g., display, buttons, keyboard, keypad, touch screen, mouse, etc., and a memory 512 coupled together via a bus 514 over which the various elements may interchange data and information. Wired interface 502 may couple the network node 500 to a network, such as an enterprise network. Though only one interface is shown by way of example, those skilled in the art should recognize that network nodes may, and usually do, have multiple communication interfaces and/or multiple communication interface ports. Wired interface 502 may represent a physical network interface and includes a receiver 520 and/or a transmitter 522. In some examples, wired interface 502 is implemented on a NIC that may be removable from network node 500. In examples where network node 500 comprises a server, network node 500 may receive data and information, e.g., including operation related information, e.g., registration request, AAA services, DHCP requests, Simple Notification Service (SNS) lookups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other network devices, such as wired client-side devices, e.g., IoT devices. For example, network node 500 may include multiple wired interfaces 502 and/or wired interface 502 may include multiple physical ports to connect to multiple APs or the other wired-client-side devices within a site via respective cables. In some examples, each of the APs or other wired client-side devices connected to network node 500 may access the wired network via wired interface 502 of network node 500.

As described herein, network node 500 may measure and report network event data, including performance data, from data 530 to NMS 130. The performance data may include various parameters indicative of the performance and/or status of the wireless network, including of wired interface 502. The performance data may include performance data of wired interface 502. For example, the performance data may include a count of a number of transmit packets, a count of a number of receive packets, a number of bytes of transmit packets, a number of bytes of receive packets, an interface state, forward error correction (FEC) uncorrected errors, input cyclic redundancy check (CRC) errors, input errors, framing errors, receive power of all optical lanes, optical interface low warning threshold, optical FEC, and/or the like. NMS 130 identifies the relevant performance data from the network event data received from network node 500, and stores the performance data as performance data 139 (FIG. 1A).

Memory 512 stores executable software applications 532, operating system 540 and data/information 530. Data 530 may include a system log and/or an error log that stores event data, including performance data, for network node 500.

FIG. 6 is a table illustrating features for each of a plurality of cable classes in accordance with one or more aspects of this disclosure. The example of FIG. 6 may be an example of a mapping stored in mappings 138 (FIG. 1A-B) and/or mappings 342 (FIG. 3) and may be stored in a spreadsheet, database, or other data structure. In the example of FIG. 6, there are five different classes of cables in columns, namely, optical CWDM (coarse wavelength division multiplexing) cables, optical LR4 (long reach 4-channel) cables, optical ZR (ze best range) cables, metallic wire 25G (25 gigabit Ethernet) cables, or metallic wire 100G (gigabit Ethernet) cables. While the example of FIG. 6 shows five classes of cables, in some examples there may be more or less classes of cables than five classes of cables.

Each of these five classes of cables is associated with a corresponding feature set of one or more features (indicated by the "YES" text for the class column). (As used herein, the phrase "feature set" can refer alternatively to a set of features—as shown in FIG. 6—or to the values for a set of features.) For example, one feature set may include data indicative of interface receive packets, interface transmit packets, interface state, FEC uncorrected errors, input CRC errors, input errors, framing errors, receive power of all optical lanes, optical interface low warning threshold, and optical FEC. This feature set may be associated with an optical (ZR) class of cable. Another feature set may include data indicative of interface receive packets, interface transmit packets, interface state, FEC uncorrected errors, input CRC errors, input errors, framing errors, receive power of all optical lanes, and optical interface low warning threshold, but not data indicative of optical FEC. This feature set may be associated with an optical (OWDM) class of cable. Another feature set may include data indicative of interface receive packets, interface transmit packets, interface state, input CRC errors, input errors, framing errors, receive power of all optical lanes, and optical interface low warning threshold, but not data indicative of FEC uncorrected errors or optical FEC. This feature set may be associated with an optical (LR4) class of cable. Another feature set may include data indicative of interface receive packets, interface transmit packets, interface state, FEC uncorrected errors, and input CRC errors, but not data indicative of input errors, framing errors, receive power of all optical lanes, optical interface low warning threshold, or optical FEC. This feature set may be associated with a copper (100G) class of cable. Yet another feature set may include data indicative of interface receive packets, interface transmit packets, interface state, and input CRC errors, but not data indicative of FEC uncorrected errors, input errors, framing errors, receive power of all optical lanes, optical interface low warning threshold, or optical FEC. This feature set may be associated with a copper (25G) class of cable.

NMS 130 may determine a feature set of performance data 139 for a given cable, such as one associated with wired interface 502 (FIG. 5). For example, the cable may be determined to be an optical (ZR) cable. Based on the cable being an optical (ZR) cable, NMS 130 may determine the feature set to include data indicative of interface receive packets, interface transmit packets, interface state, FEC uncorrected errors, input CRC errors, input errors, framing errors, receive power of all optical lanes, optical interface low warning threshold, and optical FEC (as shown in FIG. 6), that is associated with wired interface 502.

A cable associated with a network interface may be a cable that is intended to be coupled to the network interface. That cable may be partially or fully uncoupled from the network interface, partially or fully uncoupled from corresponding network interface at another network device, and/or damaged.

Network management system 130 may use the determined class of the cable to select or identify a machine learning model of ML models 380 (FIG. 3) to execute to infer whether the cable may be a faulty or bad cable. For example, each class of cable may have an associated machine learning model of ML models 380 that may be specifically trained to predict or infer a faulty or bad cable for that particular class from a particular feature set of performance data 340.

NMS 130 may output to UI device 152 information about the potential bad cable. For example, NMS 130 may output an indication of the potential bad cable issue. This indication may identify a particular port, network interface, and/or network device associated with the bad cable and/or may include a recommendation to take a specific action, such as replace the bad cable or run diagnostic testing. In some examples, the indication may include a representation of interface link health. For example, NMS 130 may monitor interface link (e.g., cable) related key performance indicators (KPIs) and detect any faulty or bad link (cable) in network 100. Monitored KPIs may include interface statistics, such as features, and/or interface optics diagnostics statistics.

In some examples, NMS 130 may collect interface statistics via Paragon Insight rules for each network device and each interface via Kafka. NMS 130 may determine an operational state of a link and determine any anomalies. NMS 130 may log any detected anomalies into Elastic Search. In some examples, UI device 152 may be used to query the operational state of a link via a provided API and the state of the link may be reflected on a display.

Different machine learning models have different inherent strengths and weaknesses which may affect their use with the techniques of this disclosure. For example, strengths of a decision tree model may include handling categorical and ordinal data together with numeric data, a relatively fast inference speed, and better explainability, while weaknesses may include a tendency to overfit and relatively slow training. Strengths of a random forest model may include the ability to implicitly perform feature selection and generate uncorrelated decision trees (which may be good when there are large features), relatively less overfitting due to a bagging technique that balances bias-variance tradeoff well and is relatively accurate, and is a relatively good model for class imbalance. Weaknesses of the random forest model may include that the model is not easily interpreted, the model may be relatively computationally intensive for large datasets and be relatively slow to train. Strengths of an XGBOOST model may include relatively less feature engineering (e.g., scaling, normalization, etc.), the model is highly accurate due to a gradient boosting technique, the model handles large size data relatively well with a relatively fast inference. It should be noted that CATBOOST is an optimized XGBOOST tuned for categorical features. Weaknesses of the XGBOOST model may be that training is relatively slow and computationally intensive, the model is not interpretable, and that overfitting is possible if parameters are not properly tuned. Strengths of a logistic regression model include that the model is relatively simple, less training time is needed, and less hyperparameter tuning is needed. Weaknesses of the logistic regression model include relatively poor performance on non-linear data, relatively poor performance on irrelevant and highly correlated features, and that accuracy is generally not comparable with random forest, or XGboost. Strengths of a support vector machine (SVM) model may include relatively good performance in case of higher dimensions, solving non-linear problems (using Kernel SVM), and that outliers in data have less impact on any inference. Weaknesses of the SVM model may include that the model is relatively slow to train, and that the selection of appropriate hyperparameters is important for generalization.

For example, a decision tree model may be selected to monitor and make inferences regarding link health. In a test, more than 90 optical and copper physical interface cards (PICs) were targeted. Each of the PICs was placed into one of the five classes discussed in FIG. 6 and a machine learning model was developed and trained for each class. The machine learning models were used to determine inferences from KPIs about the link health for any interface and associated device.

For each device and for each link, a parent spark job periodically received feature vectors of performance data 139 and, as per the link type, submitted the feature vector to the appropriate model and obtained the inference regarding link health status. Such feature vectors may include at least one of a count of a number of transmit packets, a count of a number of receive packets, a number of bytes of transmit packets, a number of bytes of receive packets, and/or the like. If the link health status was determined to be bad, the line was marked, and bad link (bad cable) event (e.g., of event data 137) was generated if the bad link state remained persistent over multiple (e.g., 3) periods consistently.

In some examples, anomaly detection while onboarding a new device may be performed. For example, as the feature vector is received for a currently being onboarded device via an invoked API or a data pipeline, a check may be performed based on the rules extracted from the machine learning model (e.g., a decision tree model) and a link status may be returned based on the same. While modeling, the availability of multiple samples of the feature vector under this condition will increase the accuracy of the prediction for a currently being onboarded device.

Because a number of data samples for performing the techniques of this disclosure may be relatively small and data distribution may not be very complex, the use of a machine learning model over a deep learning model may be desirable. Several machine learning classification models were tested for determining a bad cable issue and the performance of the machine learning models was compared. The FI scores, measuring the accuracy of each of the models are as follows: Logistic regression 0.956957, random forest 0.958627, catboostclassifier 0.958627, decision tree 0.958627, XGBClassifier 0.958492, and SVM 0.958250. As such, random forest, catboostclassifier, and decision tree performed the best during the testing.

Figure 7:
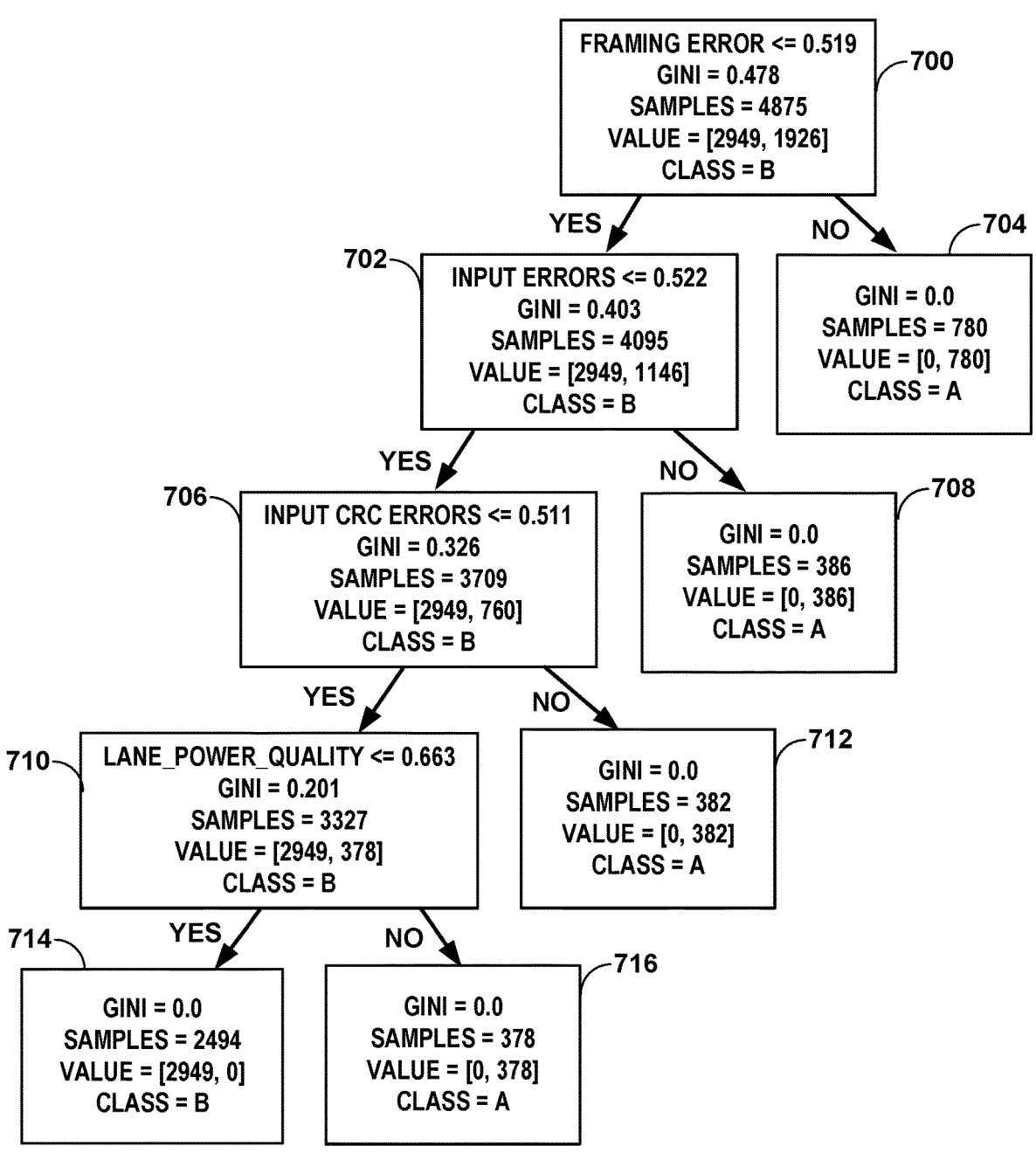
FIG. 7 is a conceptual diagram illustrating an example decision tree structure in accordance with one or more aspects of this disclosure.

FIG. 7 is a conceptual diagram illustrating an example decision tree structure in accordance with one or more aspects of this disclosure. Each internal node represents a test for a feature, each leaf node represents a class label which may be an inference made after determining all features, and each branch represents a conjunction of features leading to a given leaf node. The example of FIG. 7 may represent an example machine learning model of ML models 380.

For example, node 700 may test whether a framing error value is less or equal to 0.519. If the framing error value is less than or equal to 0.519 (the "YES" path from node 700), NMS 300 may follow the branch leading to node 702. If the framing error value is not less than or equal to 0.519 (e.g., is greater than 0.519 and the "NO" path from node 700), NMS may follow the branch leading to node 704.

Node 702 may test whether an input errors value is less than or equal to 0.522. If the input errors value is less than or equal to 0.522 (the "YES" path from node 70), NMS 300 may follow the branch leading to node 706. If the input errors value is not less than or equal to 0.522 (e.g., is greater than 0.522 and the "NO" path from node 702), NMS may follow the branch leading to node 708.

Node 706 may test whether an input CRC errors value is less than or equal to 0.511. If the input CRC errors value is less than or equal to 0.511 (the "YES" path from node 706), NMS 300 may follow the branch leading to node 710. If the input CRC errors value is not less than or equal to 0.511 (e.g., is greater than 0.511 and the "NO" path from node 706), NMS may follow the branch leading to node 712.

Node 710 may test whether a lane_power_quality value is less or equal to 0.663. If the lane_power_quality value is less or equal to 0.663 (the "YES" path from node 710), NMS 300 may follow the branch leading to node 714. If the lane_power_quality value is not less or equal to 0.663 (e.g., is greater than 0.663 and the "NO" path from node 710), NMS may follow the branch leading to node 716.

Each of nodes 704, 708, 712, and 716 are of class=A, which indicates a class 1 anomaly, or a potential bad cable. Each of nodes 700, 702, 706, 710, and 714 are of claims=B, which indicates class 0, or no anomaly at that particular node. For decisions regarding cables that reach node 716, such cables may be considered good, or not bad, cables.

Other information included in FIG. 7, include values for "samples" which indicates a total number of records in training landing in that particular node and a "Gini" Index or Gini Impurity which is calculated by subtracting the sum of the squared probabilities of each class from one (1).

A decision tree does not require any domain knowledge, may be relatively easily understood, and the learning and classification steps of a decision tree may be relatively simple and fast. Principles used in a decision tree include entropy, Gini impurity, and information gain.

Entropy is now discussed. For a binary random variable Y (e.g., a binary classification with a class of 0 or 1), the entropy of Y may be determined as:

$$H(Y) = -P(Y = 0)\log(P(Y = 0)) - P(Y = 1)\log(P(Y = 1))$$

where P(Y=0) is the probability Y=0, and P(Y=1) is the probability Y=1.

Assuming the probability P(Y=1) is p, then the entropy becomes:

$$H(Y) = -p\log(p) - (1 - p)\log(1 - p)$$

A Gini impurity or index is also a measure like entropy and may be used to measure purity. Gini impurity may measure how frequently an element may be incorrectly labeled if it is randomly labeled. For example, if GI is Gini impurity, the Gini impurity of a random variable Y may be determined as:

$$GI(Y) = 1 - \sum ki = 1 - (p(yi)^2)$$

For a binary classification:

$$GI(y) = 1 - [(p(yi = 1))^2 + (p(yi = 0))^2]$$

Information gain may be determined using Gini-Impurity also as:

Information Gain=GI (Gini Impurity) of parent node—Weighted GI of the child nodes Model tuning is now discussed. Parameters may be tuned from the best model selected by a Grid-Search mechanism. One such parameter is a tree depth of the decision tree model. The tree depth may include a maximum depth of the tree. If there is no maximum depth, nodes may be expanded until all leaf nodes are pure or until all leaf nodes contain less than min_samples_split samples. A leaf node is pure if all points in the leaf node have a same class label. Another parameter is a learning rate, such as a learning rate for gradient boosting. Another parameter may include a number of trees, such as a number of trees for gradient boosting.

An example model training pipeline may use a Kubeflow pipeline (e.g., part of the Kubeflow ecosystem) for the entire training process from data acquisition, to training, to tuning of the model. In such an example, the end product of the pipeline may include the generation of the model package in ".pkl" form An example model serving/inference pipeline may include a trained and tuned model being pythonized, saved, dockerized, and served using the Seldoncore/Kfserving pipeline available as part of the Kubeflow ecosystem. Live analytics data associated with wired interfaces of various network devices may be used for inferencing and results may be updated through a graphical user interface of UI device 152 and/or in a database, such as event data 137.

Outcome(s) of the inference may include automatically rerouting traffic to avoid a suspected faulty cable; automatically running diagnostics, such as TDR-based cable analytics on the suspected faulty cable; providing a recommendation to reroute traffic; providing a recommendation to run diagnostics, such as TDR-based cable analytics; and/or providing a recommendation to replace the suspected faulty cable. In some examples, after a suspected faulty cable is replaced, the system may rerun the model to determine whether the new cable is a suspected faulty cable.

FIG. 8 is a flow chart illustrating example bad cable detection techniques in accordance with one or more aspects of this disclosure. NMS 300 may determine a class of a cable associated with one of the plurality of network interfaces (800). For example, NMS 300 may execute a "show chassis hardware" command, look up the one of the plurality of network interfaces and its associated class of cable in mappings 138 and/or 342, or the like to determine the class of the cable.

NMS 300 may select, based on the class of the cable, a first machine learning model of the plurality of machine learning models (802). For example, ML models 380 may include a plurality of machine learning models, each trained with respect to a particular class of cable. NMS 300 may identify the first machine learning model as the machine learning model trained to operate with the specific class of the cable. In some examples, associations between ML models 380 and the classes of cables may be stored in mappings 342.

NMS 300 may determine, based on the class of the cable and the one of the plurality of network interfaces, a first feature set of performance data 340 (804). For example, NMS 300 may identify data within performance data 340 that is included in features of the class of cable, such as those identified in mappings 342, and is specifically data associated with the one or the plurality of network interfaces. For example, if the cable is associated with wired interface 230, and is a copper (25G) type cable, NMS 300 may determine the first feature set to include interface receive packet, interface transmit packet, interface state, and input CRC error data associated with wired interface 230 as the first feature set.

NMS 300 may execute the first machine learning model to infer, based on the first feature set, a potential bad cable issue associated with the first cable (806). For example, NMS 300 may execute the machine learning model corresponding to the class of the cable to infer whether there is a potential bad cable issue associated with the cable.

NMS 300 may output an indication of the potential bad cable issue associated with the cable (808). For example, if the first machine learning model infers there is a potential bad cable issue, NMS 300 may output an indication of the potential bad cable issue for the cable.

In some examples, the first feature set includes at least one of a count of a number of transmit packets, a count of a number of receive packets, a number of bytes of transmit packets, a number of bytes of receive packets, an interface state, forward error correction (FEC) uncorrected errors, input cyclic redundancy check (CRC) errors, input errors, framing errors, receive power of all optical lanes, optical interface low warning threshold, or optical FEC.

In some examples, the first machine learning model includes a decision tree model, a random forest model, or a CatBoostClassifier model. In some examples, the first machine learning model includes a decision tree model. In some examples, each of the plurality of machine learning models includes a corresponding decision tree model. In some examples, the plurality of machine learning models includes at least one machine learning model that is not a decision tree model.

In some examples, the indication includes at least one of a command to automatically perform diagnostics on the cable, a command to automatically reroute traffic to avoid transporting traffic over the cable, a recommendation to perform diagnostics on the cable, a recommendation to reroute traffic to avoid transporting traffic over the cable, or a recommendation to replace the cable. In some examples, the diagnostics include time domain reflector (TDR)-based diagnostics.

In some examples, the cable is a first cable. For example, NMS 300 may determine that the first cable is replaced with a second cable. NMS 300 may determine a class of the second cable. NMS 300 may select, based on the class of the second cable, a second machine learning model of the plurality of machine learning models. NMS 300 may determine, based on the class of the second cable and a second of the plurality of network interfaces associated with the second cable, a second feature set of the performance data. NMS 300 may execute the second machine learning model to infer, based on the second feature set, whether there is a potential bad cable issue associated with the second cable.

In some examples, NMS 300 may automatically determine that a new network interface is being monitored by the network system, wherein the performance data is further associated with the new network interface. NMS 300 may determine a class of a new cable associated with the new network interface. NMS 300 may select, based on the class of the new cable, a second machine learning model of the plurality of machine learning models. NMS 300 may determine, based on the class of the new cable and the new network interface, a second feature set of the performance data. NMS 300 may execute the second machine learning model to infer, based on the second feature set, a new potential bad cable issue associated with the new cable. NMS 300 may output an indication of the potential bad cable issue associated with the new cable.

In some examples, the cable includes at least one of a metallic wire cable or a fiber optic cable. In some examples, NMS 300 may execute the first machine learning model on the first feature set continuously or on a periodic basis. In some examples, the class is a first class of a plurality of classes, and wherein the plurality of classes includes at least one of an optical CWDM cable, an optical LR4 cable, an optical ZR cable, a metallic wire 25G cable, or a metallic wire 100G cable.

In some examples, NMS 300 may normalize values of each feature of the first feature set prior to or as part of executing the first machine learning model. In some examples, NMS 300 may determine a plurality of cables of a same class as the class of the cable, each of the plurality of cables associated with a corresponding network interface of the plurality of network interfaces. NMS 300 may determine respective first feature sets for the plurality of cables. NMS 300 may, for each particular feature among the first feature sets, normalize values of the particular feature across the first feature sets.

In some examples, NMS 300 may output the indication of the potential bad cable issue associated with the cable based on a determination that the potential bad cable issue associated with the cable remains persistent for at least a predetermined period of time.

In some examples, each of the plurality of machine learning models is trained on corresponding training data of a corresponding class of cable. In some examples, the class of the cable includes an optical cable class, and the corresponding training data for the first machine learning model includes data generated using a variable optical attenuator. In some examples, the cable is associated with the first network interface by being at least partially coupled to the first network interface. In some examples, NMS 300 may modify a configuration of a network based on the indication of the potential bad cable issue associated with the cable.

Based on the indication of the potential bad cable issue associated with the cable, a technician may modify a configuration of the network to, e.g., replace the cable, reconfigure an interface of the cable, replace an interface card or interface to which the cable was connected, or otherwise modify the configuration of the network. Based on the indication of the potential bad cable issue associated with the cable, NMS 300 may automatically modify a configuration of the network to, e.g., reroute traffic around the cable and/or device to which the cable is connected, reconfigure the device to which the cable is connected, or otherwise modify the configuration of the network to ameliorate negative effects caused by sub-optimal operation of the cable.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above-described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology-Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/ lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software, and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any compa-rable means, or the like. In general, any device capable of implementing a state machine that is in turn capable of implementing the methodology illustrated herein can benefit from the various communication methods, protocols, and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile proces-sors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or effi-ciency requirements of the system, the particular function, and the particular software or hardware systems or micro-processor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily imple-mented in software and/or firmware that can be stored on a storage medium to improve the performance of a pro-grammed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications trans-ceiver.

It is therefore apparent that there have at least been provided systems and methods for automatically identify potential faulty or bad cable issues for any cable that may be deployed within a network, regardless of the type or intended use of the cable. Many alternatives, modifications and variations would be or are apparent to those of ordinary skill in the applicable arts. Accordingly, this disclosure is intended to embrace all such alternatives, modifications, equivalents, and variations that are within the spirit and scope of this disclosure.

What is claimed is:

1. A network management system comprising:
one or more memories storing a plurality of machine learning models and performance data associated with each of a plurality of network interfaces; and
one or more processors coupled to the one or more memories and configured to:
determine a first class of a first cable associated with one of the plurality of network interfaces;
select, based on the first class of the first cable, a first machine learning model of the plurality of machine learning models;
determine, based on the first class of the first cable and the one of the plurality of network interfaces, a first feature set of the performance data;
execute the first machine learning model to infer, based on the first feature set, a potential bad cable issue associated with the first cable;
output, based on the inference of the potential bad cable issue associated with the first cable, a command to automatically reroute traffic to avoid transporting traffic over the first cable;
automatically determine that a new network interface is being monitored by the network management sys-tem, wherein the performance data is further asso-ciated with the new network interface;
determine a second class of a new cable associated with the new network interface;
select, based on the second class of the new cable, a second machine learning model of the plurality of machine learning models;
determine, based on the second class of the new cable and the new network interface, a second feature set of the performance data;
execute the second machine learning model to infer, based on the second feature set, a new potential bad cable issue associated with the new cable; and
output an indication of the new potential bad cable issue associated with the new cable.

2. The network management system of claim 1, wherein the first class of the first cable comprises one of: a) an optical coarse wavelength division multiplexing cable and wherein the first feature set comprises at least one of a count of a number of transmit packets or a number of bytes of transmit packets, at least one of a count of a number of receive packets or a number of bytes of receive packets, an interface state, forward error correction (FEC) uncorrected errors, input cyclic redundancy check (CRC) errors, input errors, framing errors, receive power of all optical lanes, and an optical interface low warning threshold; b) an optical long reach 4-channel cable and wherein the first feature set comprises at least one of the count of the number of transmit packets or the number of bytes of the transmit packets, at least one of the count of the number of receive packets or the number of bytes of the receive packets, the interface state, the input CRC errors, the input errors, the framing errors, the receive power of all optical lanes, and the optical interface low warning threshold; c) an optical ze best range cable and wherein the first feature set comprises at least one of the count of the number of transmit packets or the number of bytes of the transmit packets, at least one of the count of the number of receive packets or the number of bytes of the receive packets, the interface state, the FEC uncorrected errors, the input CRC errors, the input errors, the framing errors, the receive power of all optical lanes, the optical interface low warning threshold, and an optical FEC; d) a metallic wire 25 gigabit Ethernet cable and wherein the first feature set comprises at least one of the count of the number of transmit packets or the number of bytes of the transmit packets, at least one of the count of the number of receive packets or the number of bytes of the receive packets, the interface state, and the input CRC errors; or e) a metallic wire 100 gigabit Ethernet cable and wherein the first feature set comprises at least one of the count of the number of transmit packets or the number of bytes of the transmit packets, at least one of the count of the number of receive packets or the number of bytes of the receive packets, the interface state, the FEC uncorrected errors, and the input CRC errors.

3. The network management system of claim 1, wherein the first machine learning model comprises a random forest model or a CatBoostClassifier model.

4. The network management system of claim 1, wherein the first machine learning model comprises a decision tree model.

5. The network management system of claim 1, wherein each of the plurality of machine learning models comprises a corresponding decision tree model.

6. The network management system of claim 1, wherein the indication comprises at least one of a command to automatically perform diagnostics on the new cable, a command to automatically reroute traffic to avoid transporting traffic over the new cable, a recommendation to perform diagnostics on the new cable, a recommendation to reroute traffic to avoid transporting traffic over the new cable, or a recommendation to replace the new cable.

7. The network management system of claim 6, wherein the diagnostics comprise time domain reflector (TDR)-based diagnostics.

8. The network management system of claim 1, wherein the one or more processors are further configured to:
    determine a third class of a second cable;
    select, based on the third class of the second cable, a third machine learning model of the plurality of machine learning models;
    determine, based on the third class of the second cable and a second of the plurality of network interfaces associated with the second cable, a third feature set of the performance data; and
    execute the third machine learning model to infer, based on the third feature set, whether there is a potential bad cable issue associated with the second cable.

9. The network management system of claim 1, wherein the first cable comprises at least one of a metallic wire cable or a fiber optic cable.

10. The network management system of claim 1, wherein the one or more processors are configured to execute the first machine learning model on the first feature set continuously or on a periodic basis.

11. The network management system of claim 1, wherein the first class and the second class are of a plurality of classes, and wherein the plurality of classes comprises at least one of an optical CWDM (coarse wavelength division multiplexing) cable, an optical LR4 (long reach 4-channel) cable, an optical ZR (ze best range) cable, a metallic wire 25G (25 gigabit Ethernet) cable, or a metallic wire 100G (gigabit Ethernet) cable.

12. The network management system of claim 1, wherein the one or more processors are further configured to normalize values of each feature of the first feature set prior to or as part of executing the first machine learning model.

13. The network management system of claim 12, wherein as part of normalizing values of each feature of the first feature set, the one or more processors are configured to:
    determine a plurality of cables of a same class as the first class of the first cable, each of the plurality of cables associated with a corresponding network interface of the plurality of network interfaces;
    determine respective first feature sets for the plurality of cables; and
    for each particular feature among the first feature sets, normalize values of the particular feature across the first feature sets.

14. The network management system of claim 1, wherein the one or more processors are further configured to:
    output the indication of the potential bad cable issue associated with the first cable based on a determination that the potential bad cable issue associated with the first cable remains persistent for at least a predetermined period of time.

15. The network management system of claim 1, wherein each of the plurality of machine learning models is trained on corresponding training data of a corresponding class of cable.

16. The network management system of claim 15, wherein the first class of the first cable comprises an optical cable class, and wherein the corresponding training data for the first machine learning model comprises data generated using a variable optical attenuator.

17. A networking method comprising:
    determining a first class of a first cable associated with one of a plurality of network interfaces;
    selecting, based on the first class of the first cable, a first machine learning model of a plurality of machine learning models;
    determining, based on the first class of the first cable and the one of the plurality of network interfaces, a first feature set of performance data;
    executing the first machine learning model to infer, based on the first feature set, a potential bad cable issue associated with the first cable;
    outputting, based on the inference of the potential bad cable issue associated with the first cable, a command to automatically reroute traffic to avoid transporting traffic over the first cable;
    automatically determining that a new network interface is being monitored by a network management system, wherein the performance data is further associated with the new network interface;
    determining a class of a new cable associated with the new network interface;

selecting, based on the class of the new cable, a second machine learning model of the plurality of machine learning models;

determining, based on the class of the new cable and the new network interface, a second feature set of the performance data;

executing the second machine learning model to infer, based on the second feature set, a new potential bad cable issue associated with the new cable; and outputting an indication of the new potential bad cable issue associated with the new cable.

18. The method of claim 17, further comprising:

modifying a configuration of a network based on the indication of the new potential bad cable issue associated with the new cable.

19. Non-transitory computer-readable storage media comprising instructions that, when executed by a network management system that manages a network, cause one or more processors of the network management system to:

determine a first class of a first cable associated with one of a plurality of network interfaces;

select, based on the first class of the first cable, a first machine learning model of a plurality of machine learning models;

determine, based on the first class of the first cable and the one of the plurality of network interfaces, a first feature set of performance data;

execute the first machine learning model to infer, based on the first feature set, a potential bad cable issue associated with the first cable;

output, based on the inference of the potential bad cable issue associated with the first cable, a command to automatically reroute traffic to avoid transporting traffic over the first cable;

automatically determine that a new network interface is being monitored by the network management system, wherein the performance data is further associated with the new network interface;

determine a class of a new cable associated with the new network interface;

select, based on the class of the new cable, a second machine learning model of the plurality of machine learning models;

determine, based on the class of the new cable and the new network interface, a second feature set of the performance data;

execute the second machine learning model to infer, based on the second feature set, a new potential bad cable issue associated with the new cable; and output an indication of the new potential bad cable issue associated with the new cable.

\* \* \* \* \*